(12) United States Patent
Trotta et al.

(10) Patent No.: US 9,275,557 B2
(45) Date of Patent: *Mar. 1, 2016

(54) ULTRASOUND PHANTOM MODELS, MATERIALS, AND METHODS

(71) Applicant: Gaumard Scientific Company, Inc., Miami, FL (US)

(72) Inventors: Thomas Neil Trotta, Naples, FL (US); Jennifer Anne Trotta, Naples, FL (US); Siobhain Lowe, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,721

(22) Filed: Mar. 24, 2014

(65) Prior Publication Data

US 2014/0308643 A1    Oct. 16, 2014

Related U.S. Application Data

(63) Continuation of application No. 13/031,087, filed on Feb. 18, 2011, now Pat. No. 8,678,831.

(60) Provisional application No. 61/305,982, filed on Feb. 19, 2010.

(51) Int. Cl.
    *G09B 23/28*      (2006.01)
    *B29C 39/00*      (2006.01)
    (Continued)

(52) U.S. Cl.
    CPC ............ *G09B 23/286* (2013.01); *B29C 39/006* (2013.01); *B29C 39/021* (2013.01); *B29C 39/025* (2013.01); *B29C 39/10* (2013.01); *G09B 23/28* (2013.01); *G09B 23/30* (2013.01); *B29L 2031/7532* (2013.01)

(58) Field of Classification Search
    USPC .......................... 434/262, 267, 268, 272, 273
    See application file for complete search history.

(56) References Cited

U.S. PATENT DOCUMENTS

4,001,951 A    1/1977   Fasse
4,134,218 A    1/1979   Adams et al.
(Continued)

FOREIGN PATENT DOCUMENTS

JP      2008/150447 A    7/2008
KR    10/0301711 B1     3/2003
(Continued)

OTHER PUBLICATIONS

Trotta et al., U.S. Appl. No. 13/031,116, filed Feb. 18, 2011.
(Continued)

*Primary Examiner* — Kurt Fernstrom
(74) *Attorney, Agent, or Firm* — Haynes and Boone, LLP

(57) ABSTRACT

Devices, systems, and methods appropriate for use in medical training that include materials that better mimic natural human tissue are disclosed. In one aspect a polysiloxane mixture for simulating human biological tissue, especially human breast tissue, is disclosed. In another aspect, a method of manufacturing a biological tissue ultrasound phantom is disclosed. In another aspect, a human breast tissue models are disclosed. In some instances, the human breast tissue model includes at least one simulated pathological structure that simulates such pathologies as a cyst, a medullary carcinoma, a ductal carcinoma, an infiltrating scirrhus carcinoma, a lobular carcinoma, and a fibroadenoma.

20 Claims, 15 Drawing Sheets

(51) Int. Cl.
  *B29C 39/02* (2006.01)
  *B29C 39/10* (2006.01)
  *G09B 23/30* (2006.01)
  *B29L 31/00* (2006.01)

(56) References Cited

U.S. PATENT DOCUMENTS

| | | | |
|---|---|---|---|
| 4,351,344 | A | 9/1982 | Stenzler |
| 4,439,162 | A * | 3/1984 | Blaine .................... 434/268 |
| 4,655,716 | A | 4/1987 | Hoevel |
| 4,737,109 | A | 4/1988 | Abramson |
| 4,867,686 | A | 9/1989 | Goldstein |
| 5,775,916 | A | 7/1998 | Cooper et al. |
| 5,803,746 | A | 9/1998 | Barrie et al. |
| 5,853,292 | A | 12/1998 | Eggert et al. |
| 5,900,438 | A | 5/1999 | Miyoshi et al. |
| 6,068,602 | A | 5/2000 | Tham et al. |
| 6,193,519 | B1 | 2/2001 | Eggert et al. |
| 6,443,735 | B1 | 9/2002 | Eggert et al. |
| 6,485,308 | B1 | 11/2002 | Goldstein |
| 6,503,087 | B1 | 1/2003 | Eggert et al. |
| 6,527,558 | B1 | 3/2003 | Eggert et al. |
| 6,568,941 | B1 | 5/2003 | Goldstein |
| 6,758,676 | B2 | 7/2004 | Eggert et al. |
| 6,817,865 | B2 | 11/2004 | Charbonneau |
| 6,854,976 | B1 | 2/2005 | Suhr |
| 7,114,954 | B2 | 10/2006 | Eggert et al. |
| 7,272,766 | B2 | 9/2007 | Sakezles |
| 7,419,376 | B2 | 9/2008 | Sarvazyan et al. |
| 7,549,866 | B2 | 6/2009 | Cohen et al. |
| 7,976,312 | B2 | 7/2011 | Eggert et al. |
| 7,976,313 | B2 | 7/2011 | Eggert et al. |
| 8,016,598 | B2 | 9/2011 | Eggert et al. |
| 2002/0076680 | A1 | 6/2002 | Logan |
| 2002/0076681 | A1 | 6/2002 | Leight et al. |
| 2005/0214772 | A1 | 9/2005 | Stoianovici et al. |
| 2007/0050027 | A1 | 3/2007 | McGhan et al. |
| 2007/0087314 | A1 | 4/2007 | Gomo |
| 2007/0172804 | A1 | 7/2007 | Allen et al. |
| 2007/0218442 | A1 | 9/2007 | Dupuis et al. |
| 2008/0076099 | A1 | 3/2008 | Sarvazyan et al. |
| 2008/0131855 | A1 | 6/2008 | Eggert et al. |
| 2009/0148822 | A1 | 6/2009 | Eggert et al. |
| 2011/0207102 | A1 | 8/2011 | Trotta et al. |
| 2011/0207103 | A1 | 8/2011 | Trotta et al. |
| 2011/0207104 | A1 | 8/2011 | Trotta et al. |
| 2011/0207105 | A1 | 8/2011 | Eggert et al. |

FOREIGN PATENT DOCUMENTS

| | | |
|---|---|---|
| WO | WO 2008/021720 A2 | 2/2008 |
| WO | WO 2009/039210 A9 | 3/2009 |
| WO | WO 2009/088304 A1 | 7/2009 |

OTHER PUBLICATIONS

WIPO International Searching Authority, Search Report for PCT/US2011/025055, Feb. 16, 2011, 3 pages.
WIPO International Searching Authority, Search Report for PCT/US2011/025513, Feb. 18, 2011, 4 pages.
WIPO International Searching Authority, Search Report for PCT/US2011/025515, Feb. 18, 2011, 3 pages.
WIPO International Searching Authority, Search Report for PCT/US2011/025519, Feb. 18, 2011, 5 pages.

* cited by examiner

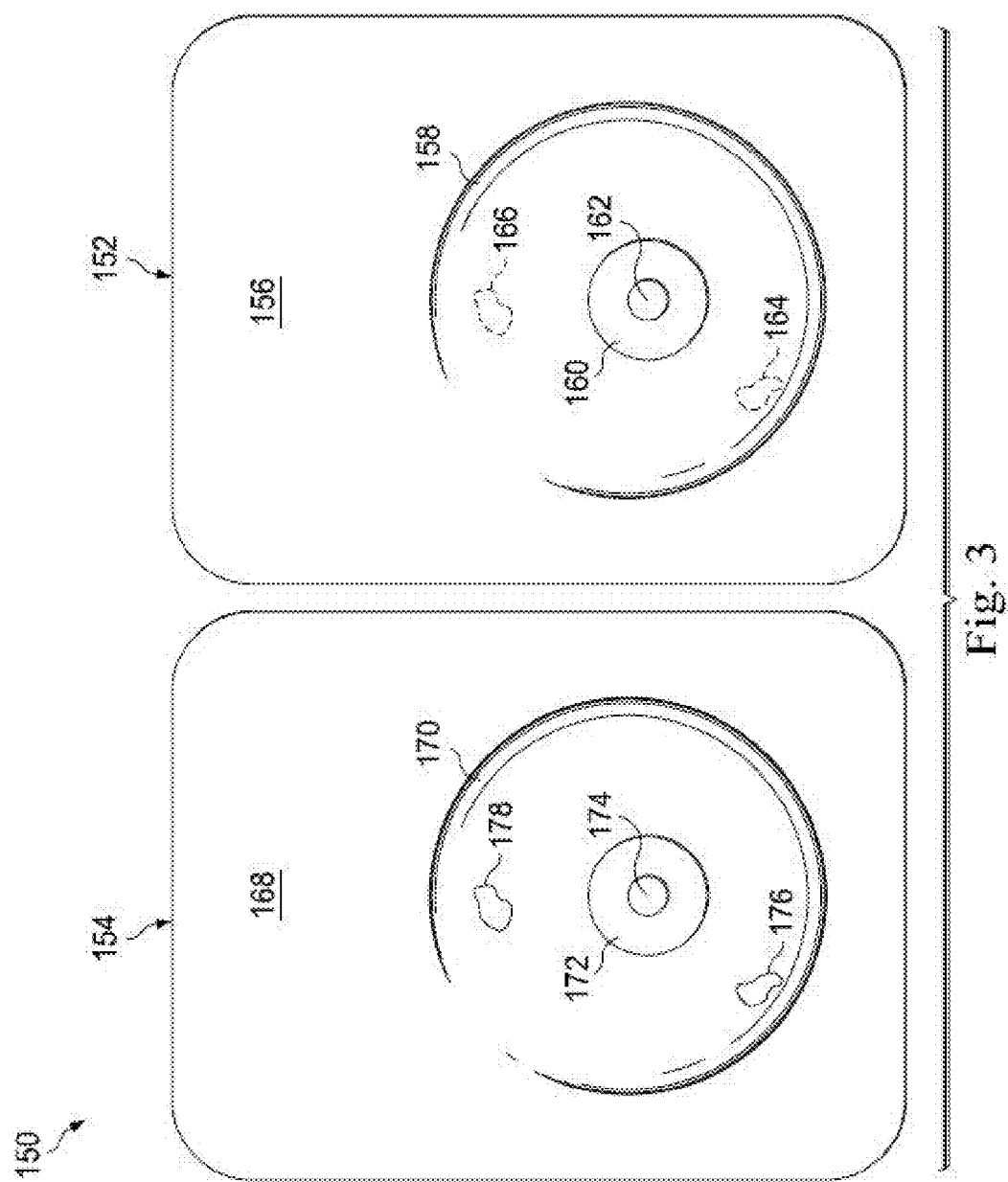

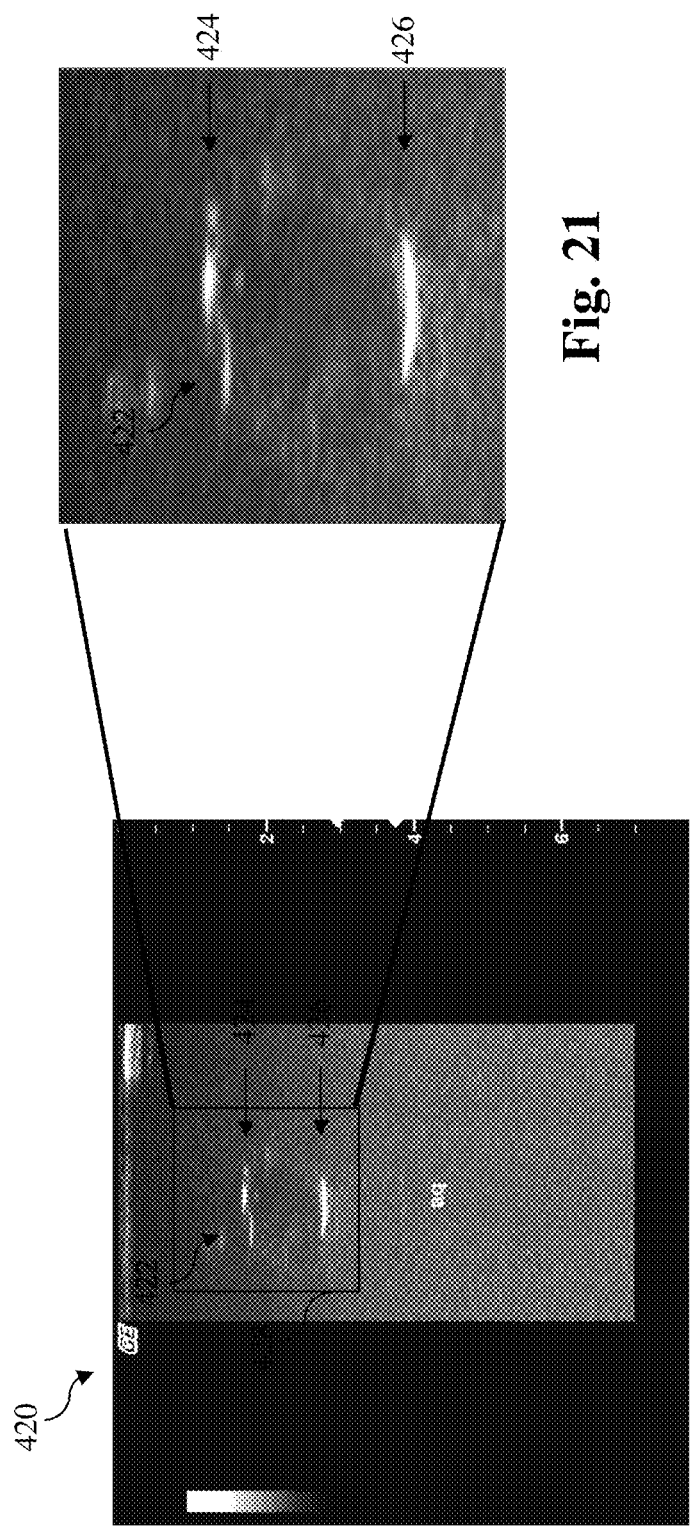

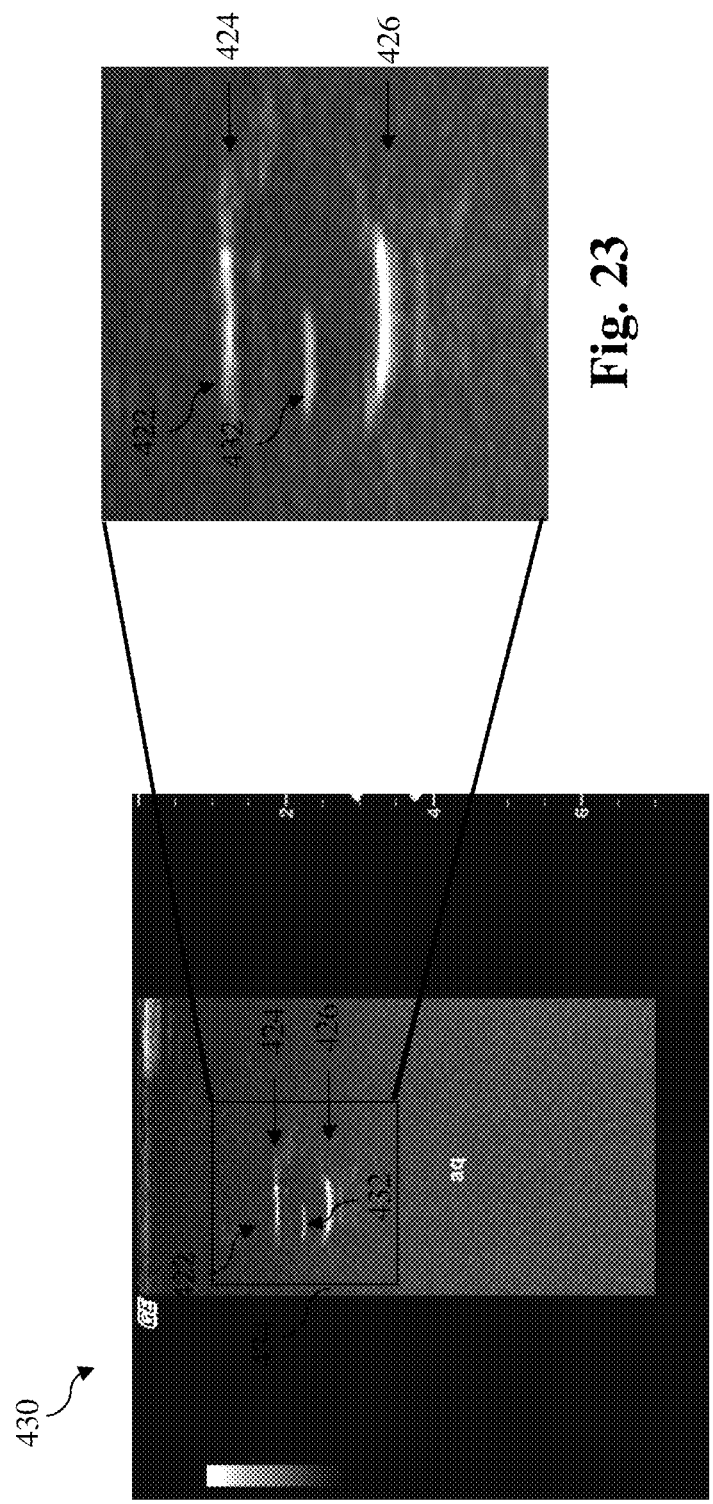

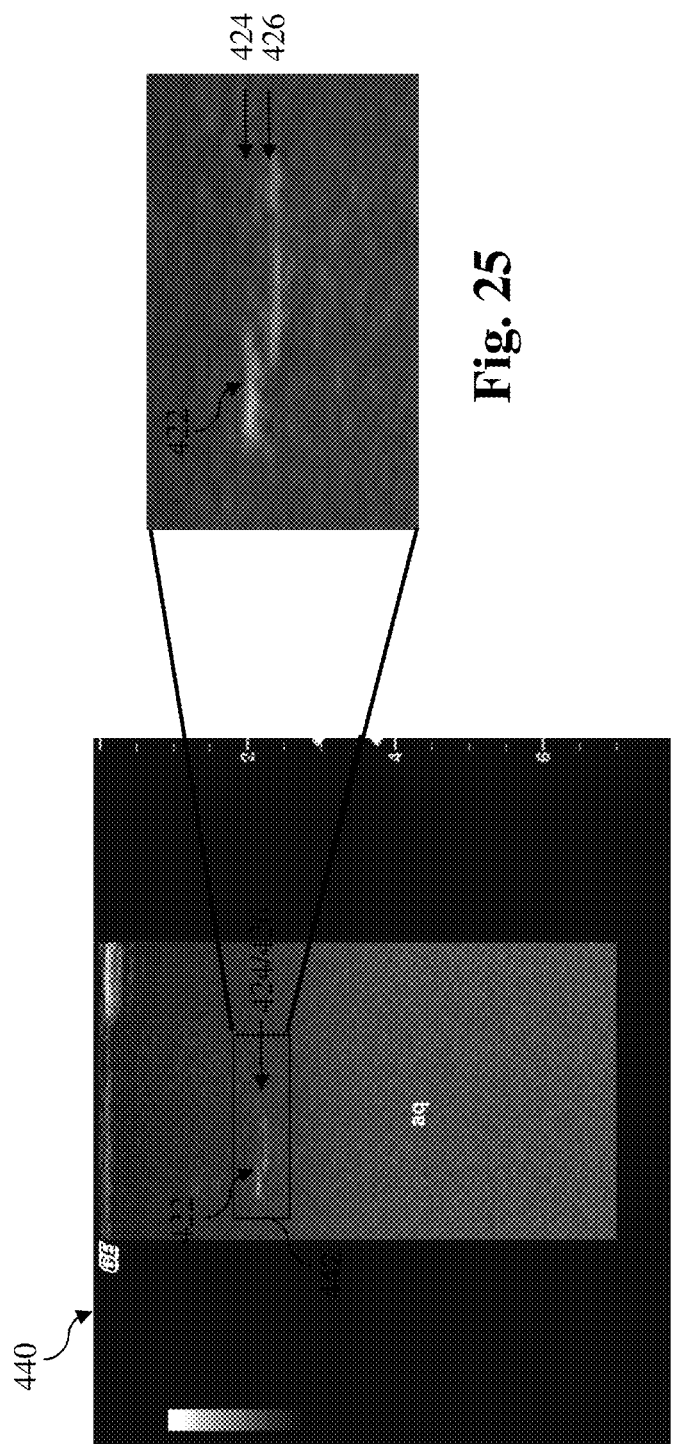

ULTRASOUND PHANTOM MODELS, MATERIALS, AND METHODS

CROSS-REFERENCE TO RELATED APPLICATIONS

The present application is a continuation of U.S. patent application Ser. No. 13/031,087 filed Feb. 18, 2011, now U.S. Pat. No. 8,678,831, which is a non-provisional application that claims priority to U.S. Provisional Patent Application No. 61/305,982 filed Feb. 19, 2010 and titled "Polysiloxane Materials and Methods that Mimic Tissue," which is hereby incorporated by reference in its entirety. The present application is related to U.S. patent application Ser. No. 13/031,102, filed Feb. 18, 2011, now U.S. Pat. No. 8,608,483, and titled "BREAST TISSUE MODELS, MATERIALS, AND METHODS", which is hereby incorporated by reference in its entirety.

BACKGROUND

As medical science has progressed, it has become increasingly important to provide non-human interactive formats for teaching patient care. Non-human interactive devices and systems can be used to teach the skills needed to successfully identify and treat various patient conditions without putting actual patients at risk. Such training devices and systems can be used by medical personnel and medical students to learn the techniques required for proper patient care. The training devices and systems can also be used by patients to learn the proper way to perform self-examinations.

As the use of non-human interactive training formats has increased, the need for materials that simulate natural human tissue has also increased. There have been earlier attempts to mimic characteristics of natural human tissues. For example, U.S. Patent Application Publication No. 2008/0076099 discloses human tissue phantoms and associated methods of manufacturing that utilize two-component silicone gels covered by a nylon fabric. Also, U.S. Pat. No. 5,805,665, U.S. Pat. No. 4,277,367, U.S. Pat. No. 5,902,748, and U.S. Pat. No. 6,675,035 each disclose various materials intended to simulate imaging properties of human tissue for various types of imaging techniques. Further, U.S. Pat. No. 6,945,783 discloses a breast examination training system with inflatable nodules that simulate tumors within the breast tissue. While these earlier attempts at mimicking aspects of natural human tissue have been adequate in some respects, they have been inadequate in many respects. Accordingly, there remains a need for materials that better mimic natural human tissue. In that regard, the training of medical personnel and patients is greatly enhanced through the use of realistic hands-on training with devices and systems, such as those of the present disclosure, that better mimic characteristics of natural human tissue than previous materials.

Polysiloxanes are the most common and one of the most important organosilicon polymers used in polymer chemistry. The silanol, $SiO(Me)_2$, is the key functional group in the synthesis of these polymers. It is very important to understand the chemistry of the individual elements of the polymer as well as the behavior of the functional group in order to understand the characteristics of polysiloxane polymers.

Silicon is a Group 4 (IVA) element found in the periodic table beneath carbon, and it is, by far, the most abundant element in the Group 4 elements. Some of its characteristics are similar to carbon, but overall it can be seen as a completely different element. It makes up 27% of the earth's crust by mass, and it is second in abundance in the world (after oxygen). Silicon has semi-metallic properties, thus, it is important in the semiconductor industry with wide ranges of applications in computers and solar energy collection. It is very rare to find silicon by itself in nature; it is usually bound to oxygen as either $SiO_2$ or $SiO_4$. Silicon dioxide has many forms found in nature, the most common being quartz, a major constituent of sandstone and granite, as well as being a major component of glass.

Silicon bonding can be compared to carbon bonding in many ways. Carbon is the backbone of life and can form chains of infinite length. Silane, $SiH_4$, and methane, $CH_4$, are both very stable tetrahedral compounds. As you build chains, however, the carbon chain is stable but the silane chains' stability decreases with length. This is due to many factors: 1) the Si—Si bond is slightly weaker than the C—C bond, 2) the Si—H bond is weaker than the C—H bond, 3) silicon is less electronegative than hydrogen while carbon is more electronegative than hydrogen, and 4) silicon is larger, providing greater surface area, and has low lying d orbitals, which promotes nucleophilic attack.

Polysiloxanes are known for their useful properties, such as flexibility, permeability to gases, low glass transition temperature, $T_g$, and low surface energy. Polysiloxanes exhibit two types of flexibility: torsion flexibility and bending flexibility. Torsion flexibility is the ability of the atoms to rotate around a chemical bond. Bending flexibility occurs when there is a large hindrance between non-bonded atoms where there are unfavorable torsion angles.

In view of the foregoing, there remains a need for devices, systems, and methods appropriate for use in medical training that include materials that mimic natural human tissue.

SUMMARY

Devices, systems, and methods appropriate for use in mimicking natural human tissue are disclosed. Generally, the materials of the present disclosure are utilized to simulate natural tissue and, in particular, natural human tissue. In some instances, the materials of the present disclosure have particular application in the field of medical simulation. In some instances, the materials of the present disclosure provide a lifelike feel to simulated human skin and underlying tissue.

In one aspect a polysiloxane mixture for simulating human biological tissue is disclosed. The mixture comprises a silicone foam and a silicone oil, where the silicone foam and the silicone oil are combined in a manner such that the resulting mixture has physical material properties simulating a natural human biological tissue. In some instances, the silicone foam is present in an amount of about 10 to 45 percent by weight of the total mixture weight, while the silicone oil is present in an amount of about 55 to 90 percent by weight of the total mixture weight. In one particular instance, the silicone foam is present in an amount of about 25 percent by weight of the total mixture weight, while the silicone oil is present in an amount of amount of about 75 percent by weight of the total mixture weight. The silicone oil has a viscosity of about 30 to 500 centipoise in some embodiments. The silicon oil has a low molecular weight silicone oil in some embodiments. The silicone foam is a closed cell silicone foam in some embodiments. In some instances, the polysiloxane mixture further comprises a silicone thermoset. In some embodiments, the silicone foam and the silicone thermoset comprise a platinum catalyzed silicone. In some embodiments, the resulting polysiloxane mixture has physical material properties simulating the natural human biological tissue, including ultrasound properties such that ultrasound equipment typically used to visualize the natural human biological tissue can be used in a similar manner to visualize the resulting mixture. In some instances, the ultrasound materials of the present disclosure do not include a silicone foam.

In another aspect, a method of manufacturing a biological tissue phantom is disclosed. The method comprises mixing a silicone oil with a silicone foam to form a blend, pouring the blend into a mold, stirring the blend until a foaming reaction starts, and allowing the blend to cure. The cured blend has physical material properties simulating a natural human biological tissue and in some instances, human breast tissue. In some instances, the method includes adding a silicone thermoset to reduce and quantity of the foam cells. In some embodiments, the silicone foam is a two-component platinum silicone foam. In some embodiments, the silicone oil is a low molecular weight silicone oil. In some instances, the amount of silicone oil that is mixed is about three times the amount of the silicone foam.

In another aspect, a human breast tissue model is disclosed. The human breast tissue model comprises a simulated breast tissue comprising a mixture of a silicone foam and a silicone oil and a simulated skin layer covering the simulated breast tissue. The simulated skin layer comprises a silicone thermoset. The simulated breast tissue and the simulated skin layer are sized and shaped to mimic a natural human breast. In some instances, the human breast tissue model includes at least one simulated pathological structure imbedded within the simulated breast tissue. The at least one simulated pathological structure is formed of a material different than the simulated breast tissue. In some embodiments, at least one simulated pathological structure simulates a pathology selected from a group consisting of a cyst, a medullary carcinoma, a ductal carcinoma, an infiltrating scirrhus carcinoma, a lobular carcinoma, and a fibroadenoma. In some instances, the at least one simulated pathological structure is formed of a silicone thermoset. In one embodiment, the at least one simulated pathological structure is formed of a silicone thermostat having a shore hardness of about 10 A. In some instances, the human breast tissue model includes at least one simulated anatomical structure imbedded within the simulated breast tissue at an anatomically appropriate location. In some embodiments, at least one simulated anatomical structure simulates an anatomical structure selected from a group consisting of a lymph node, a pectoralis muscle, and a rib. In some instances, the human breast tissue model includes a fastener attached to a portion of the human breast tissue model. In some embodiments, the fastener is configured to allow the human breast tissue model to be affixed to a base. In some instances, the base is a female torso or manikin.

BRIEF DESCRIPTION OF THE DRAWINGS

The present disclosure can be better understood from the following detailed description when read with the accompanying figures.

FIG. 3 is a perspective view of a pair of breast tissue models according to one aspect of the present disclosure.

FIG. 20 is an ultrasound rendering of an ultrasound phantom of the present disclosure showing the presence of a simulated cyst.

FIG. 21 is a close-up view of the cyst of the ultrasound rendering of FIG. 20.

FIG. 22 is an ultrasound rendering of the ultrasound phantom of FIGS. 20 and 21 showing the introduction of a needle for aspirating the cyst.

FIG. 23 is a close-up view of the cyst and needle of the ultrasound rendering of FIG. 22.

FIG. 24 is an ultrasound rendering of the ultrasound phantom of FIGS. 20-23, showing the fully aspirated cyst.

FIG. 25 is a close-up view of the fully aspirated cyst of the ultrasound rendering of FIG. 24.

DETAILED DESCRIPTION OF PREFERRED EMBODIMENTS

Figure 2:
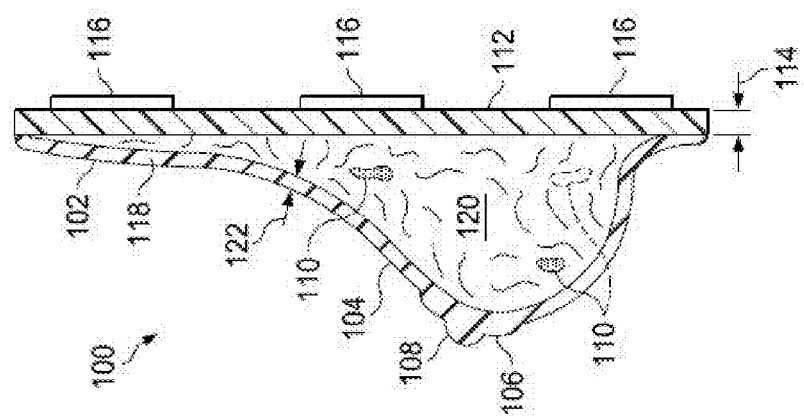
FIG. 2 is a cross-sectional side view of the breast tissue model of FIG. 1.

The present invention is directed to polysiloxane materials that have unique physical properties that mimic biological tissue, including very low flexural modulus (tendency for a material to bend), exceptional resilience (the power or ability to return to original form or position after being bent, compressed, or stretched; elasticity), and self sealing characteristics (ability to automatically seal punctures). Products that are properly constructed from these materials in accordance with the present disclosure provide properties that include the tactile properties, ultrasound properties, and resilient properties of biological tissue. The products formed from the inventive materials simulate real skin and tissue, and are resistant to deterioration, even after repeated puncture by needles and other medical instruments. The products formed from the inventive materials of the present disclosure can also advantageously mimic aspects of real medical procedures, e.g., natural closure of a puncture. The materials of the present disclosure provide lower flexural modulus with greater recovery than materials previously used to recreate the look and feel of biological tissue.

One purpose of the inventive materials and methods described herein is the production of simulators for use in medical procedure and examination technique training. Other uses contemplated, however, include any application that requires the feel and appearance of animal tissue, especially human tissue. Such applications include, without limitation, puppets, taxidermy, robotics, and sex toys.

The materials of the present invention include a mixture of at least two polysiloxane or silicone materials (1) a silicone foam or gel and (2) a silicone oil or fluid. The combination of the oil with the foam produces a material that feels and acts surprisingly similar to certain biological tissue. The present disclosure provides materials that mimic the feel of human tissue and provides materials that mimic the ultrasound properties of human tissue. A material formed of a silicone foam and a silicone oil or fluid produces a material that is very soft and flexible and mimics the feel of certain human tissues, such as the softness of a human breast. This material is not as useful as a matrix for ultrasound as other materials of the present disclosure due to the air encapsulated in the foam. However, the material is very useful as a target in an ultrasound applications. For example, in some instances it is utilized as a target within a material formed of silicone gel, fused silica, and silicone fluid, which has excellent properties for use as an ultrasound matrix (as well as targets within the ultrasound matrix).

As used herein, the term "silicone foam" designates a polyorganosiloxane composition in the form of a foam. Silicone foam is produced by a condensation reaction between a siloxane polymer containing silanol (Si—OH) groups and crosslinkers containing silane (Si—H) groups, typically in the presence of a catalyst. When these compounds are mixed and reacted together, the formation of siloxane linkages (Si—O—Si) occurs, liberating hydrogen gas, which acts as the blowing agent to make the material into foam. Because of its high silicone content, silicone foam is typically less flammable than flexible polyurethane foam.

The foamable silicone compositions according to the present invention may be any of those which are commercially available that include an organosilicon polymer including siloxane units having a silicon-bonded hydrogen atom, a hydroxy bearing material, for example an organosilicon polymer including siloxane units providing silicon-bonded hydroxyl groups, and a catalyst, for example a tin compound or more preferably a noble metal compound or complex. These compositions cure according to the scheme OH+≡Si—H–>≡Si—O+H$_2$. A polymeric material reactive with the silicon-bonded hydrogen atoms, for example an organosilicon polymer having silicon-bonded hydroxyl and/or unsaturated e.g., vinyl groups, may be included in the mixture so that a network of interconnected polysiloxane chains is produced and the hydrogen evolved as a gas serves to form cells within the developing network. Preferred foam forming, curable organosilicone polymer compositions include a polydiorganosiloxane having silicon-bonded unsaturated, e.g., vinyl groups, available for reaction with polysiloxanes having silicon-bonded hydrogen atoms. The addition reaction that occurs is appropriate to yield chain extended or crosslinked elastomeric silicone products, but does not generate volatile materials for causing foaming in the curing composition. The foaming may be achieved by chemical reaction of the silicon-bonded hydrogen atoms with silicon-bonded hydroxyl groups and/or water or an aliphatic alcohol, or by inclusion in the composition of a volatile blowing agent. The polysiloxanes and other ingredients and the proportions thereof are selected so that the network is sufficiently developed and cured to produce a resilient foam of desired cellular structure within a short period of time, on the order of a few minutes or less.

Suitable polysiloxanes include siloxane units having a silicon-bonded hydrogen atom include polysiloxanes having units according to the general formula $$R_p HSiO_{(3-p)/2}$$

in which each R represents a monovalent hydrocarbon group containing 1 to 20 carbon atoms, for example a lower alkyl or phenyl group, e.g., a methyl group, and p is 1 or 2. The polysiloxanes may also comprise units (i)

$$R_n SiO_{(4-n)/2}$$

in which R is as referred to above and n is 1, 2 or 3. Preferably, the polysiloxane has from 0.3% to 2.5% by weight of silicon-bonded hydrogen atoms. Each R preferably represents a methyl group. Preferably, terminal groups of the polysiloxane have the formula $R_3SiO_{1/2}$, where each R represents a methyl group. Suitable polysiloxanes include those comprising MeHSiO units with or without the presence of Me$_2$SiO (where Me represents a methyl group) units and having viscosities on the order of from about 1 to about 1000 mm$^2$/s, more preferably from about 5 to about 50 mm$^2$/s.

Suitable polysiloxanes having silicon-bonded unsaturated, e.g., vinyl groups available for reaction with polydiorganosiloxanes having silicon-bonded hydrogen atoms include polysiloxanes having siloxane units according to the general formula $$R_m R'SiO_{(3-m)/2}$$

in which each R represents a monovalent hydrocarbon group having up to 20 carbon atoms, for example a lower alkyl or phenyl group, e.g., a methyl radical, m is 1 or 2 and R' represents an aliphatically unsaturated group for example cyclohexenyl or a group CH=CHR" linked to the silicon atom, for example via a divalent aliphatic chain wherein R" represents a hydrogen atom or an alkyl group for example vinyl, allyl or hexenyl. These polysiloxanes also comprise units (i) in which R and n are as referred to above. These materials are reactive with the silicon-bonded hydrogen atoms in presence of a noble metal catalyst by a hydrosilylation reaction and thus contribute to the polysiloxane matrix. Preferably these polysiloxanes have from 0.0002% to 3% by weight of aliphatically unsaturated groups and n is such that they have a viscosity on the order of about 10 mm²/s to about 500,000 mm²/s. Preferred compositions employ a polysiloxane having siloxane units according to the general formula $$R_mR'SiO_{(3-m)/2}$$

in which R' represents a group CH=CH₂ linked to the silicon atom via a divalent aliphatic chain and having a viscosity in the range 100 mm²/s to 2000 mm²/s.

Suitable organosilicon polymers including siloxane units providing a silicon-bonded hydroxyl group include polydiorganosiloxanes having at least two siloxane units of the formula $$R_aQ_bSiO_{(4-(a+b))/2}$$

in which a has a value of 0, 1 or 2, b has a value of 1 or 2 and the sum of a+b is not greater than 3, Q represents a hydroxyl group for example silanol terminated polydiorganosiloxanes according to the general formula HO((R₂)SiO)ₛH in which each R represents a methyl group and has a value from about 10 to about 1200. Suitable materials have viscosities on the order of about 10 mm²/s to about 500,000 mm²/s. Preferred compositions which provide the more elastomeric foams employ polydiorganosiloxanes according to the general formula HO((R₂)SiO)ₛH as aforesaid which have viscosities on the order of about 2,500 mm²/s to about 20,500 mm²/s. The density of the silicone foam can be significantly reduced without degrading its structural strength by including a short-chain silanol terminated polydiorganosiloxane in the formulation. Preferred compositions employ polydiorganosiloxanes according to the general formula HO((R₂)SiO)ₛH as aforesaid in which s has a value from about 2 to about 10. Preferred materials have viscosities on the order of about 5 mm²/s to about 100 mm²/s.

Polydiorganosiloxanes having at least two siloxane units of the formula $$R_aQ_bSiO_{(4-(a+b))/2}$$

in which Q is a hydroxyl bearing alkylene or oxyalkylene chain may also be used. The chain may be attached to the silicon atom in any convenient way but is preferably linked to the silicon atom by a carbon atom. Suitable hydroxyl bearing chains include those containing up to 50 chain atoms. Suitable alkylene chains are those having 1 to 15, more preferably 4 to 10 chain carbon atoms. Suitable oxyalkylene chains include those of the formula (C_dH_{2d}O)_eH in which d has the value 2, 3 or 4 and e has a value in the range of 1 to 15 and more preferably in the range of 1 to 10, i.e., having from 1 to 15 and, more preferably, 1 to 10 oxyalkylene groups. The oxyalkylene groups may be for example oxyethylene, oxypropylene or oxybutylene or mixtures thereof, the most preferred being the oxyethylene group. This polydiorganosiloxane also comprises siloxane units (i) as aforesaid. Other materials that may be included as crosslinking agents include materials having three or more functional e.g., hydroxy groups per molecule.

The foam compositions for use in the present invention preferably include one or more alcohols. These materials influence the structure of the foams formed by use of the composition and yield cured foams of low density. The alcohol is selected with a view to contributing not only to the generation of hydrogen gas, but also with a view to achieving desired resilience of the foam. Suitable alcohols include the primary aliphatic and araliphatic alcohols for example the lower aliphatic mono functional alcohols having up to 8 carbon atoms, e.g., ethanol, propanol, butanol and benzyl alcohol. Foams of lowest density are formed by use of the aliphatic alcohols having from 2 to 12 chain carbon atoms. Preferred compositions employ n-propanol.

Compositions suitable for use in the invention also preferably employ a foam stabiliser or surfactant. Suitable foam stabilizing materials include fluorinated silicones, for example a polyorganosiloxane comprising $$(CF_2)_m(CH_2)_nO_pSiO_{(4-p)/2}$$

R₃SiO_{1/2}, SiO_{4/2} units and silicon bonded hydroxyl groups wherein each R represents a monovalent hydrocarbon group containing from 1 to 20 carbon atoms, m is an integer having an average value of from 1 to 20, n has the value 1 or 2, p has the value 1, 2, or 3. The polysiloxane may also include from 0 to 10 percent, based on the weight of said polyorganosiloxane, of GSiO_{3/2} units wherein G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule. These materials may be prepared by treatment of hexamethyldisiloxane coated polysilicates with the alcohol F(CF₂)₈CH₂CH₂OH. They serve to stabilize the structure of the foam during its curing.

Suitable noble metal catalysts for use in the foamable compositions include rhodium and platinum containing materials. Platinum catalysts may take any of the known forms, ranging from platinum as deposited on carriers such as silica gel or powdered charcoal to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on color of the mixture. Platinum complexes may also be used, e.g., those prepared from chloroplatinic acid hexahydrate and divinyl tetramethyldisiloxane. Compositions according to the invention foam and cure very rapidly when the component parts have been mixed together. If it is desired to prolong the cure time, for example if it is desired to mix the composition and then transfer it to the site where it is intended to foam and cure, one may include in the composition one of the known platinum catalyst inhibitors such as a polymethylvinylsiloxane cyclic compound or an acetylenic alcohol, e.g., methyl butynol. Larger proportions of catalyst may be used when a faster cure is desired.

There are no special limitations with regard to the types of silicone oil used in the present invention. The silicone oil generally has a viscosity between about 50 cps and about 400 cps. The silicone oil may have a completely linear, partially-branched linear, cyclic, or a branched-chain molecular structure. The most preferable is a linear or a cyclic molecular structure, with a low molecular weight. For example, the silicone oil can be a dimethylpolysiloxane having both molecular terminals capped with trimethylsiloxy groups, a methylphenylpolysiloxane having both molecular terminals capped with trimethylsiloxy groups, a copolymer of methylphenylsiloxane and dimethylsiloxane having both molecular terminals capped with trimethylsiloxy groups, a copolymer of methyl (3,3,3-trifluoropropyl) siloxane and dimethylsiloxane having both molecular terminals capped with trimethylsiloxy groups, a cyclic dimethylsiloxane, or a cyclic methylphenylsiloxane. For example, the silicone oil can be an oil similar to those mentioned above, such as, a dimethylpolysiloxane having both molecular terminals capped with dimethylvinylsiloxy groups, a copolymer of methylvinylsiloxane and dimethylsiloxane having both molecular terminals capped with dimethylvinylsiloxy groups, a methylvinylpolysiloxane having both molecular terminals capped with trimethylsiloxy groups, or a cyclic methylvinylsiloxane. It is preferred that the silicone oil have a viscosity of 1 to 100,000,000 centipoise, preferably 2 to 10,000,000 centipoise, more preferably 25 to 1,000 centipoise, and most preferably 50 to 300 centipoise at 25° C. Preferred examples of silicone oil are polydimethylsiloxane and simethicone.

In an exemplary embodiment, the silicone mixture includes a silicone closed cell foam blended with a low molecular weight silicone oil. The addition of the low molecular weight silicone oil to the closed cell silicone foam produces a material with exceptional low modulus, i.e., very flexible in a manner that is similar to natural human tissue. This mixture of silicone materials also provides a product that has a recoil similar to human tissue.

To make the silicone mixture, typically one part silicone foam (e.g., Smooth-On Soma Foama® 15 and three parts silicone oil (e.g., BJB Enterprises TC-5005-C or SilPak F-100 is prepared. The silicone oil is first mixed with part A of the foam. In some embodiments, the silicone foam cell structure produces a specific gravity of 0.15 to 0.30 g/cm$^3$, processing with the silicone oil. This mixture is then blended with part B of the foam until thoroughly mixed. The resulting blend is then poured into a mold cavity or the product cavity and is stirred until the foaming reaction starts. The stifling is discontinued.

In some applications, a third component, such as a soft silicone thermoset is added. Generally, the silicone thermoset has a low durometer hardness, which is between about 0010 and about 0040 in some instances. In some embodiments, Smoothon Ecoflex 0010 is utilized. The addition of the silicone thermoset reduces the quantity of foam cells present. In some instances, when the resulting product is to be an ultrasonic phantom, the foam can be eliminated by use of a soft silicone thermoset if the desired physical properties of the foam are not needed.

The materials of the present disclosure have similar ultrasonic properties to natural human tissue such that ultrasound machines and equipment typically used for examining natural human tissue may similarly be used to examine the materials of the present disclosure. In some instances, the tissue-mimicking material for use in ultrasound has the same range of speeds of sound, attenuation coefficients, and backscatter coefficients as the corresponding natural human tissue. Speeds of sound in human soft tissues is thought to vary over a fairly small range with an average value of about 1540 m/s, while the speed of sound in fat is thought to be about 1470 m/s. The amplitude attenuation coefficients in these tissues appear to vary over the range from about 0.4 dB/cm to about 2 dB/cm at a frequency of 1 MHz.

Ultrasound phantoms are used to train medical personnel and to calibrate ultrasound equipment. The phantom consists of targets imbedded in a matrix material. The targets are used to mimic features of the body such as abnormal tissue, blood vessels and bone. The matrix may have several layers that mimic the layers of tissue and fluids of the body. Medical ultrasound evaluations have recently employed techniques that determine the flexibility of targets. This advancing technology is used to distinguish benign growths from cancerous tumors.

Mixtures of unfilled silicone gels (i.e., where silicone gel is understood to contain only siloxane and no fillers such as fused silica or silicone oils) will successfully transmit ultrasound waves of common frequencies used in medical practices. The depth of penetration is greater than 10 cm and much greater when the proper ultrasound frequencies are applied. The materials are tough, have high elongation (100% to 1000% at break) and can be made with a wide range of flexibilities. Silicone gels and silicones filled with silicone liquids and fused silicones can be obtained from Factor II, AZ. An example of an unfilled silicone gel is Factor II A-341. An example of a filled silicone is Factor II LSR-05. These materials are suitable for use as ultrasound matrix and targets. In that regard, in some instances a silicone gel comprises 20-75% of the mixture, fused silica comprises 0-50% of the mixture, and silicone fluid comprises 0-50% of the mixture.

The reflectivity of silicone targets can be adjusted to simulate various types of human tissues and abnormalities. Silicone targets can be varied to create images that mimic soft to rigid tissues. The density and flexibility of silicone targets, and the corresponding reflectivity of the targets when visualized using ultrasound, is selectable by changing the corresponding ratio of silicone gel, fused silica, and silicone oils. Changing the bulk modulus and/or density (vs. the matrix) determines the strength of the echo. The greater this difference the greater the reflection. The density of unfilled silicone thermosets (containing silicone gel, fused silica, and silicone oil) can vary from approximately a specific gravity of 0.9 to 1.5 g/cc. In one embodiment, the matrix material is formed of a Shore 0010 silicone and two targets are positioned within the matrix material. The first target is formed of Shore 30 A silicone (silicone gel and fused silica) and the second target is formed of Shore 0030 silicone (silicone gel, fused silica and silicone oil). The two targets reflect differently under ultrasound. The 30 A target will have greater reflection than the 0030 silicone target. The silicone gel/fused silica/silicone oil offers a wide range of bulk modulus/density to facilitate a wide range of reflection strengths relative to a corresponding matrix material.

Targets can also be used within the silicone matrixes that do not contain silicone. Examples of such targets are spaces within the matrix that contain air, water, and/or saline solutions. In some instances, fluid filled spaces within the silicone matrix material are utilized to represent blood vessels and/or other fluid filled organs of the body such as cysts. Additional examples of non-silicone targets include thermoplastics and thermosets. The range of thermoplastics that can be used is almost unlimited: some examples are nylons, polyethylene, polyesters, styrene-ethylene-butylene-styrene and polyurethane. Thermosets include polyurethanes, latex, polysulfide, and various epoxies. Silicone foams, such as those described herein, are used as targets in some instances. The foam can be used with or without silicone fluids and silicone thermosets. These closed cell foams are used to represent highly reflective tissue such as bone and gas filled organs, in some instances.

Utilizing silicone materials as the matrix and targets of an ultrasound phantom as described by the present disclosure are modifiable for use in a wide variety of ultrasound applications. In that regard, a greater range of reflection from the targets can be produced with non-filled silicones than filled thermoplastics. The targets can be made to realistically mimic a broad range of tissues and abnormalities without the need for non-silicone fillers. In some instances, increased reflectivity is achieved by not applying a vacuum to the silicone during production. In that regard, by not applying a vacuum to the silicone, the resulting targets will contain small pockets of air that increase the reflectivity under ultrasound examination (See FIG. 35, for example). Further, the silicone targets of the present disclosure are also suitable for use within a matrix of other polymers such as thermoplastics.

A construction of silicone mixtures as layers and targets has advantages over non-silicones and neat silicone gels. The silicone mixtures of the present disclosure, when properly formulated and cured, will bond to properly formulated silicone targets or layers without adhesives. This allows the model to be layered without air gaps that can interfere with the ultrasound imaging. In that regard, construction of phantoms is accomplished in some instances by constructing a base layer of silicone matrix and then positioning targets on the layer then covering with the targets and base layer with another layer of silicone matrix. This method of construction facilitates the exact positioning of the targets within the phantom and results in the targets being bonded to the matrix, while preventing the formation of a layer of air around the targets. Further, the filled silicone matrix of the present disclosure is significantly more durable than neat silicone gels.

Figure 1:
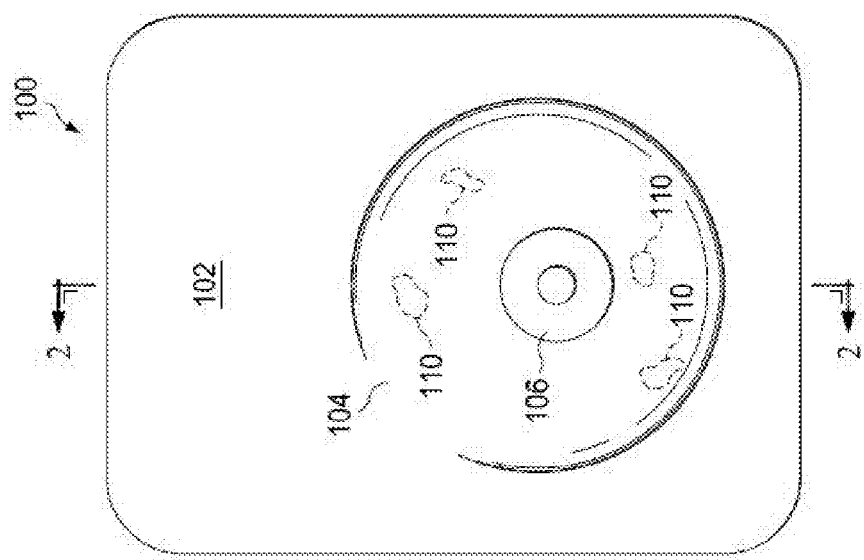
FIG. 1 is a front view of a breast tissue model according to one aspect of the present disclosure.

In some instances, the inventive silicone mixtures of the present disclosure are used to manufacture biological tissue phantoms to train medical professionals and/or the general public. In one embodiment, the mixtures are manufactured into tissue models for breast self examination. For example, referring now to FIGS. 1 and 2, shown therein is a breast tissue model 100 according to one aspect of the present disclosure. In that regard, FIG. 1 is a front view of the breast tissue model 100, while FIG. 2 is a cross-sectional side view of the breast tissue model.

As shown in FIG. 1, the breast tissue model 100 includes a foundation 102 from which a breast 104 extends. In that regard, the breast 104 is sized and shaped to simulate a natural human breast. Accordingly, the breast 104 will have different sizes and shapes in various embodiments. Specifically, the breast 104 may be sized and shaped to represent natural human breasts of varying cup size, age, medical condition, and other aspects. In some instances, the foundation 102 is sized and shaped to simulate the anatomy surrounding the natural human breast. The breast 104 includes an areola 106 and a nipple 108. The areola 106 and the nipple 108 are similarly sized and shaped to simulate a natural human areola and nipple. Accordingly, the areola 106 and/or the nipple 108 will have different sizes and shapes in various embodiments. Within the breast tissue model 100 are a plurality of simulated pathologies 110, which are illustrated in phantom. Generally, the pathologies 110 are sized, shaped, and have material properties to mimic various cysts, lumps, fibrous tissue, and other features found in natural breast tissue. In some instances, the pathologies mimic one or more of cysts, lumps, medullary carcinomas, ductal carcinomas, infiltrating scirrhus carcinomas, lobular carcinomas, and fibroadenomas. While illustrated as being within the breast 104, in other embodiments one or more pathologies are present in the foundation 102 of the breast tissue model 100 as well.

Referring more particularly to FIG. 2, the breast tissue model 100 includes a backing 112 that supports the foundation 102 and the breast 104. In the illustrated embodiment, the backing 112 is substantially planar with a substantially constant thickness 114. It is understood, however, that the size and shape of the backing 112 as well as the size or footprint of the foundation 102 may be varied. In some instances, the backing 112 and the foundation 102 are sized and shaped for positioning onto a base. Accordingly, in such instances, the backing 112 and foundation 102 are sized and shaped to match an area of the base that will receive the breast tissue model 100. In some instances, the backing 112 and/or the foundation 102 is contoured to accommodate for the shape of the base such that when the breast tissue model 100 is positioned on the base, the foundation 102 and the breast 104 together substantially simulate a natural human breast and the surrounding tissue. In that regard, in some embodiments the backing 112 and/or the foundation 102 is contoured to match the shape of a manikin or torso onto which the breast tissue model 100 will be mounted. Accordingly, it is understood that in some embodiments the thickness 114 of the backing 112 varies across the backing. It is also understood that the thickness 114 of the backing may vary greatly depending on an intended application for the breast tissue model 100.

In some instances, the manikin or torso includes a recess sized and shaped for receiving the breast tissue model 100. In one such embodiment, an inner surface defined by the recess of the manikin or torso is configured to mate with backing 112. As shown in FIG. 2, the backing 112 includes a plurality of fasteners 116 extending therefrom. Releasable fasteners, such as hook and loop, snaps, buttons, ties, or any other suitable fastening device, may be used to selectively attach the breast tissue model 100 to a base, including a manikin or torso. The fasteners 116 are bonded to the breast tissue model 100 with an adhesive in some instances. In some instances, the adhesive is a cyanoacrylate and primer suitable for use on a silicon thermoset. Such adhesives are currently available from Loctite® Corporation. In other instances, the breast tissue model 100 is molded or formed as part of the base (e.g., as part of a female torso or manikin) and is, therefore, permanently attached to the base.

As shown in FIG. 2, the breast tissue model 100 includes a skin layer 118 surrounding a fat or tissue layer 120. The skin layer 118 is formed of a silicone thermoset. Preferably, the silicone thermoset has a softness and resiliency similar to natural human skin and has a shore hardness of equal to or lesser than 0010. One example of a suitable silicone thermoset is Smooth-On Ecoflex® 0010. As shown, the skin layer 118 has a thickness 122. In the illustrated embodiment, the thickness 122 of the skin layer 118 is substantially constant across a majority of the breast tissue model 100. Generally, the thickness 122 of the skin layer 118 is between about 1.0 mm and about 8.0 mm, and in some instances is between about 2.0 mm and about 6.0 mm. The particular thickness of the skin may be selected in order to appropriately simulate particular skin types and/or skin locations. As shown, however, an increase in the thickness of the skin layer 118 is utilized to define the areola 106 and the nipple 108. In other instances, the thickness 122 of the skin layer 118 varies across the breast tissue model 100 in areas other than the areola 106 and nipple 108. In some embodiments, the backing 112 is formed of the same material as the skin layer 118. Colorant is added to the silicone thermoset of the skin layer 118 in order to simulate the natural colors of the skin, areola, and nipple. Also, adding colorant to the skin 118, areola 106, and nipple 108 of the breast tissue model 100 prevents a user from being able to visualize the underlying pathologies 110 within the breast tissue model. In that regard, the particular colorant added to simulate the skin, areola, and nipple colors is selected to a match that of a particular ethnic group in some instances. Generally, the skin, areola, and nipple colors of the breast tissue model 100 may be selected to match the corresponding natural skin, areola, and nipple colors of any ethnic group around the world.

The tissue layer 120 of the breast tissue model is formed from a mixture of silicone foam and silicone oil. Generally, the silicone foam is present in amount between about 10 percent and about 45 percent by weight of the total mixture weight, and the silicone oil is present in an amount between about 55 percent and about 90 percent by weight of the total mixture weight. In one particular embodiment, the mixture is comprised of one part (or about 25 percent by weight) silicone foam, e.g., Smooth-On Soma-Foama® 15, and three parts (or about 75 percent by weight) silicone oil, e.g., BJB Enterprises TC-5005-C. The pathologies 110 at the interface between tissue layer 120 and skin layer 122 are formed from a silicone thermoset. In some instances, the pathologies 110 are formed from a silicone thermoset having a shore hardness of about 10 A. An example of a suitable silicone thermoset for forming at least some of the pathologies 110 is Smooth-On Dragon Skin®. The silicon thermoset utilized for a particular pathology is dependent on the characteristics of the pathology that is to be simulated. Accordingly, it is understood that various silicon thermosets having different properties may be utilized within a breast tissue model 100 in order to simulate different pathologies.

The model 100 provides a means for teaching the techniques of breast examination to detect breast abnormalities. In that regard, in some instances the breast tissue model is particularly well suited for teaching proper techniques for detecting pathologies (e.g., cysts or lumps, including medullary carcinomas, ductal carcinomas, infiltrating scirrhus carcinomas, lobular carcinomas, and fibroadenomas) in the breast with one's hands. In some instances, the model 100 is used to teach the spiral or grid patterns of palpation of the breast. In this manner, the model 100 serves as an educational tool that can be used to teach users how to identify the signs and symptoms of breast cancer and other medical conditions. Through proper training with the devices of the present disclosure, earlier detection of breast cancer can be facilitated.

In some instances, a life size model of a human breast, typically with one or more lumps embedded in therein, is provided. In some instances, the breast tissue model is attachable to an upper part of a simulated female torso or to a full size manikin to better simulate an actual examination. In some instances, each breast includes a fastener or connector that allows the breast to be selectively attached and detached from the torso. Such detachable breasts allow for the use of breasts with different characteristics (e.g., number, size, and/or location of lumps) on the torso in order to better train users. In other instances, the breast tissue model is molded or formed as part of the female torso or manikin and is, therefore, permanently attached to the torso. During the examination, the torso to which the model is attached may be in vertical, horizontal, or reclined position. The model of the human breast and the torso or manikin are easily shipped and readily transportable.

Referring now to FIG. 3, shown therein is a breast tissue model system 150 according to one aspect of the present disclosure. The breast tissue model system 150 includes a breast tissue model 152 and a breast tissue model 154. The breast tissue model 152 is substantially similar to the breast tissue model 100 described above. In that regard, the breast tissue model 152 includes a foundation 156, a breast 158, an areola 160, a nipple 162, and pathologies 164 and 166. The structure of the breast tissue model 154 is substantially similar to the structure of the breast tissue model 152, such that the breast tissue model includes a foundation 168, a breast 170, an areola 172, a nipple 174, and pathologies 176 and 178 having substantially the same arrangement as the foundation 156, breast 158, areola 160, nipple 162, and pathologies 164 and 166. However, the breast tissue model 154 is formed without adding colorant to the skin such that the pathologies 176, 178 are visible through the skin. In that regard, the breast tissue model 154 is translucent such that the pathologies 176, 178 positioned within the breast 170 are visible to a user through the skin of the breast tissue model. To facilitate visual identification of the pathologies 176, 178, in some embodiments colorant is added to the materials forming the pathologies 176, 178 such that the pathologies 176, 178 contrast the surrounding tissue material. As the breast tissue model 154 has the same structure as the breast tissue model 152, the breast tissue model 154 can be used to show users where the various pathologies within the breast tissue model 152 are located and should have been detected. The breast tissue models 152, 154 may be provided together as a set such that the breast tissue model 152 may be considered the test model and the breast tissue model 154 the corresponding key or answer model. In some instances, the breast tissue models 152, 154 are provided as a pair of breasts, i.e., a left breast and a right breast. A specific example of the manufacturing of an embodiment similar to that shown in FIG. 3 is described below in the Examples section.

To manufacture a breast tissue model in accordance with the present disclosure, a mold is first made. As discussed above, different breast sizes for different stages of life (ages) as well as shapes can be manufactured. The mold generally defines the outside surface of the resulting breast tissue model. An initial model or master model that will serve as the basis for the mold can be sculpted, computer generated, or reproduced from a live model. After the initial model is made, a one piece silicone glove mold is made based upon the initial model. The glove mold is subsequently utilized to produce corresponding breast tissue models. The glove mold may be formed from any suitable materials. In some instances, a silicone thermoset with a hardness greater than or equal to 20 A is utilized as the glove mold. Examples of suitable glove mold materials include Smooth On Rebound® 25. By utilizing a glove mold, the resulting product will not have a parting line. Also, the glove mold can be removed gently from the resulting product, thereby limiting any potential damage to the breast tissue model caused during removal from the mold. In some instances, a mother mold is utilized to surround and support the glove mold. The mother mold can be made of any suitable thermoset material. In one embodiment, the mother mold is formed of a hard polyurethane filled with aluminum particles. In one embodiment, the mother mold is formed of Smooth On C-1508®.

In some instances, the mother mold is manufactured in an alignment box. Once the alignment box is assembled, a shim is positioned and contoured over the glove mold. Clay openings are made between the shim and the glove mold. Polyurethane plastic, e.g., Smooth On C-1508®, is poured into half of the alignment box, and the shim is removed. Mold release is applied to the plastic. A second pour of polyurethane plastic is made and poured into the other half of the alignment box. The bottom of the alignment box is removed, and the alignment box split.

In some instances, an insert is also produced to help locate the lumps in the model, and to provide a cavity to pour the silicone mixture into. To produce the insert, the glove mold is mounted in the mother mold. A layer of clay is then sculpted on the interior of the glove mold. The thickness of the clay layer defines the skin in the final breast tissue model. The clay is then marked at the positions that the lumps will be located. The cavity is filled with a material to make the insert. The material used to make the insert should be selected so the skin material will not stick and allow easy removal of the insert during production. In some instances, a hard polyurethane with aluminum particles or aluminum with Nedox® coating is utilized. Reference for alignment between the insert and mother mold can be made at this time.

The silicone mixture can be different colors to represent areas of the breast that are the most common places cancer is found. For example, internal parts of the breast can be a different color with muscles at the back of the breast poured at different times as well as in different directions allowing for realism. In that regard, an upper portion of the breast model can formed of a clear or translucent silicone, while the lower portion is formed of a colored silicone to illustrate the location of the internal parts in relation to the outside of the breast. This is similar to the concepts described above with respect to FIG. 3, where the silicone mixture of one of the breasts is colorless or translucent, to allow the pathologies within the breast tissue model to be seen. Further, the use of clear or translucent breast tissue model by itself is advantageous in some instances, as it reduces the tendency of users to simply poke the breast tissue model and encourages users to use the proper breast examination techniques instead of searching for the lumps via poking to receive instant gratification.

The silicone foam can be of different grades and cured at different temperatures or with different catalysts added to change the texture of the silicone. It is possible for each internal part of the breast to have a separate mold. The parts could then be placed inside the breast model with clear silicone poured into the mold to fill and keep the internal parts in place. The internal parts need not be made of silicone; other materials known to those of ordinary skill in the art can be used as well. The resulting breast tissue model product is realistic in appearance and has the proper feel to train individuals in the proper techniques for inspecting the breast. The product can also be used with ultrasound equipment to visualize the lumps.

Figure 4:
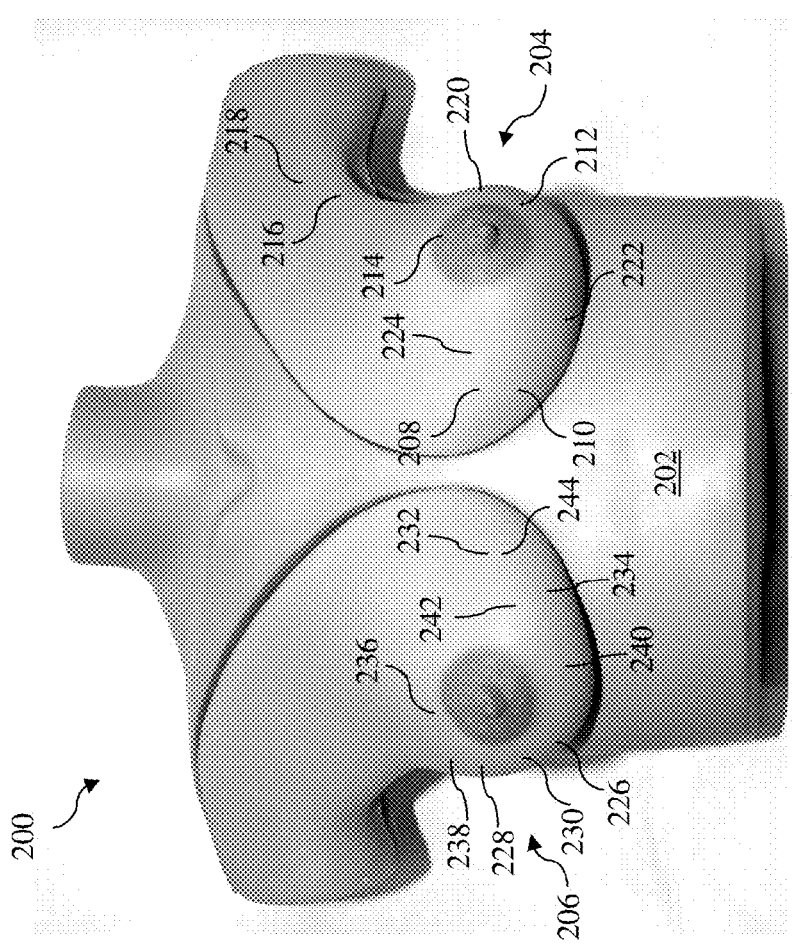
FIG. 4 is a front view of a breast tissue model according to another aspect of the present disclosure.

Referring now to FIG. 4, shown therein is a breast tissue model 200 according to another aspect of the present disclosure. As shown, the breast tissue model 200 includes a torso 202 with a left breast 204 and a right breast 206. Each of the left and right breasts 204, 206 includes a plurality of embedded anatomical features or pathologies. In particular, the left breast 204 includes six solid masses 208, 210, 212, 214, 216, and 218 and three cysts 220, 222, and 224 positioned at various locations. The right breast 206 includes different cysts 226, 228, 230, 232, 234, 236, 238, 240, 242, and 244 positioned at various locations. It is understood that fewer or a greater number of pathologies may be utilized, the size and shape of the pathologies may be modified, the positions (in three dimensions) of the pathologies may be modified from the examples shown, and the types of pathologies utilized may be modified. Further, it is understood that the pathologies may have irregular and/or geometrical shapes, depending on the type of pathology being simulated. Despite the presence of the various anatomical features within each of the left and right breasts 204 and 206, the features are not visible when looking at the skin surfaces of the breasts. In some instances, the pathologies are colored the same or approximately the same as the skin to prevent visualization of the features through the skin without the use of ultrasound. Additional details regarding the pathologies of the left and right breasts 204, 206 are discussed below with respect to FIGS. 15-26 and in the context of manufacturing Example 3.

Figure 5:
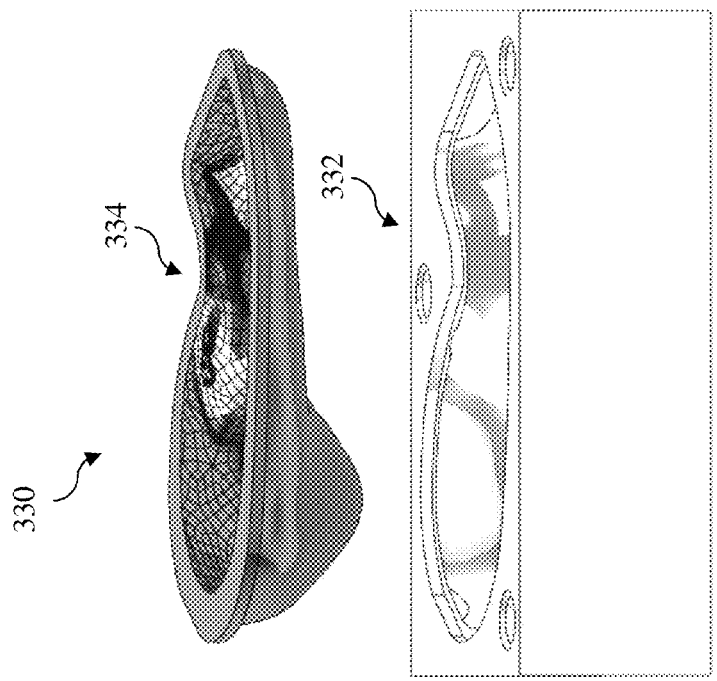
FIG. 5 is a perspective view of a molding system for forming a breast tissue model according to an aspect of the present disclosure.
Figure 8:
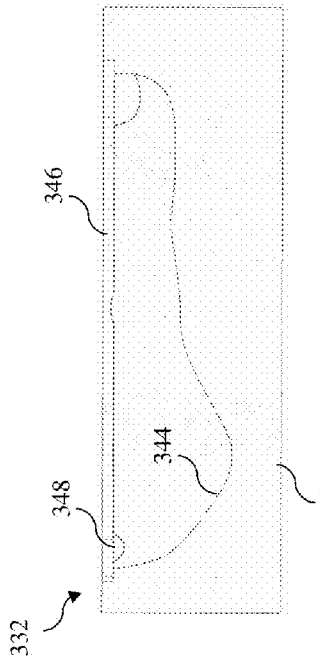
FIG. 8 is a cross-sectional side view of the mother mold of FIGS. 6 and 7, taken along section line 8-8 of FIG. 7.
Figure 9:
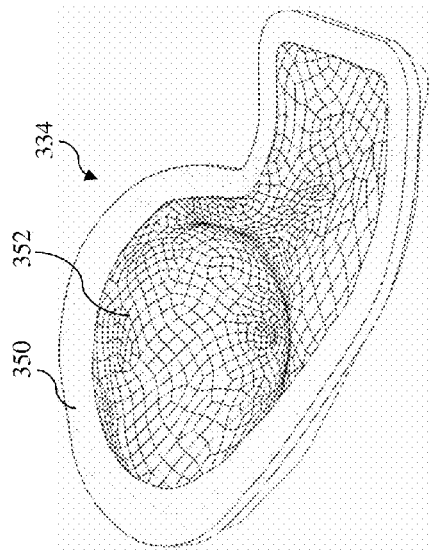
FIG. 9 is a perspective view of a glove mold of the molding system of FIG. 5.
Figure 6:
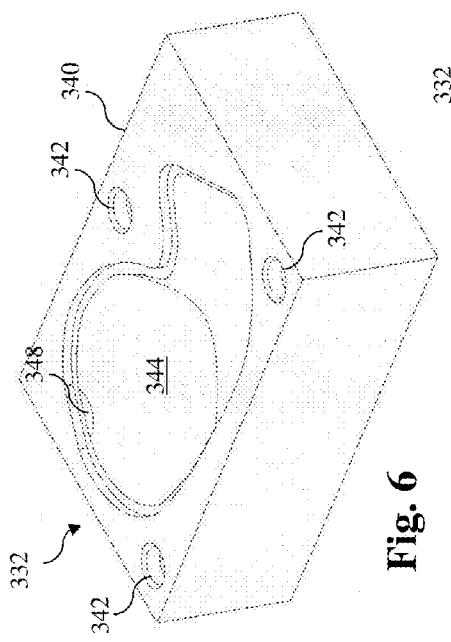
FIG. 6 is a perspective view of a mother mold of the molding system of FIG. 5.
Figure 7:
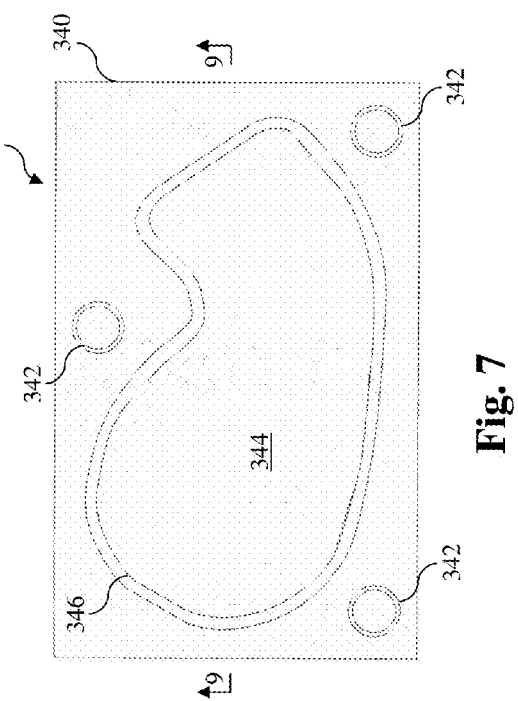
FIG. 7 is a top view of the mother mold of FIG. 6.
Figure 12:
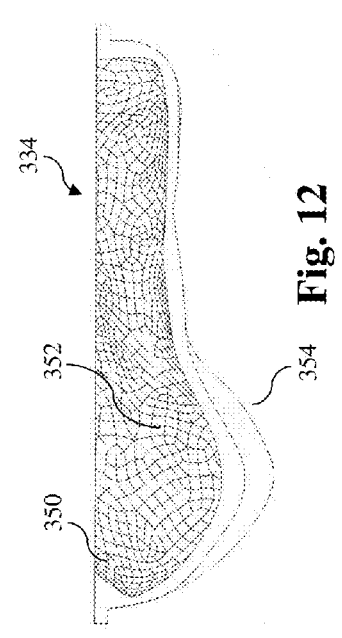
FIG. 12 is a cross-sectional side view of the glove mold of FIGS. 9-11, taken along section line 12-12 of FIG. 10.
Figure 13:
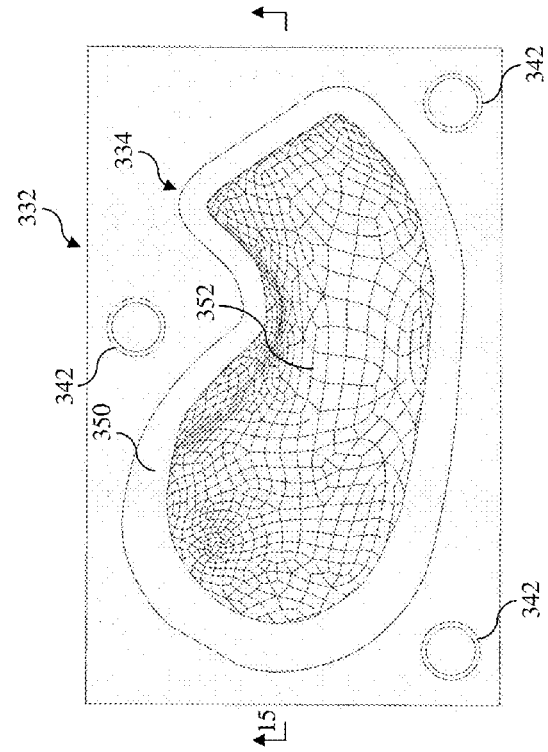
FIG. 13 is a top view of the mother mold of FIGS. 6-8 and the glove mold of FIGS. 9-12 assembled together.
Figure 10:
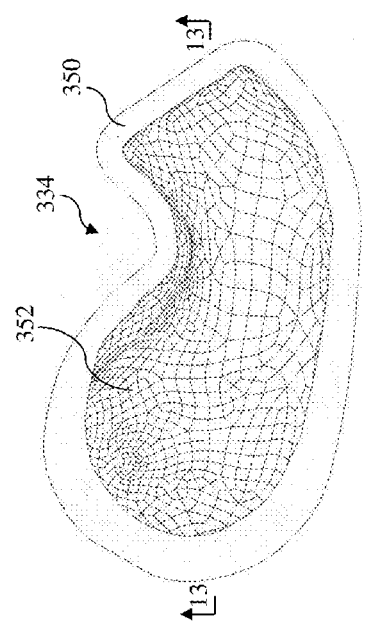
FIG. 10 is a top view of the glove mold of FIG. 9.
Figure 11:
FIG. 11 is a side view of the glove mold of FIGS. 9 and 10.
Figure 14:
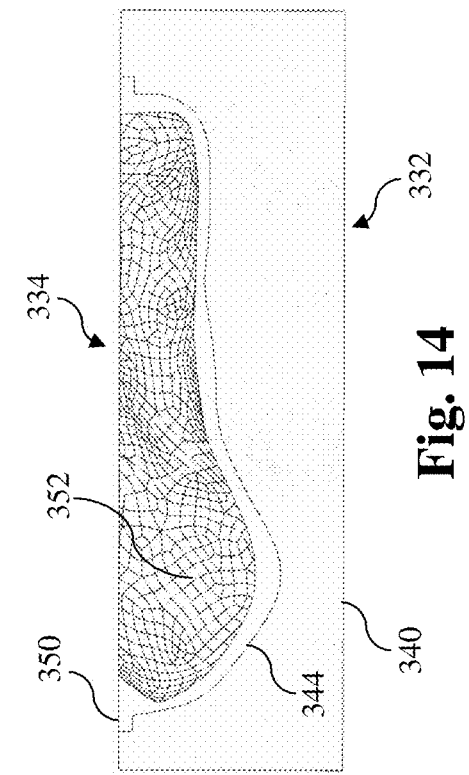
FIG. 14 is a cross-sectional side view of the assembled mother mold and glove mold of FIG. 13, taken along section line 14-14 of FIG. 13.

Referring now to FIGS. 5-14, shown therein are aspects of a molding system 330 for forming a breast tissue model, such as breast tissue model 200 described above, according to embodiments of the present disclosure. Specifically, FIG. 5 is a perspective view of the molding system; FIG. 6 is a perspective view of a mother mold 332 of the molding system; FIG. 7 is a top view of the mother mold; FIG. 8 is a cross-sectional side view of the mother mold taken along section line 8-8 of FIG. 7; FIG. 9 is a perspective view of a glove mold 334 of the molding system; FIG. 10 is a top view of the glove mold; FIG. 11 is a side view of the glove mold; FIG. 12 is a cross-sectional side view of the glove mold taken along section line 12-12 of FIG. 10; FIG. 13 is a top view of the mother mold and the glove mold assembled together; and FIG. 14 is a cross-sectional side view of the assembled mother mold and glove mold taken along section line 14-14 of FIG. 13.

Referring more specifically to FIGS. 6-8, aspects of the mother mold 332 will be described. The mother mold 332 includes a main body 340 having a generally rectangular shape. The body 340 includes a plurality of recesses or openings 342 that are configured to receive projections of the gantry 338 to facilitate proper alignment and assembly of the mold system 330, as will be discussed below. The mother mold 332 also includes a recess or depression 344 that is sized, shaped, and contoured to simulate an outer surface of a natural breast and/or surrounding tissue. In that regard, the particular size, shape, and contour of the depression 344 is selected based on the type (size, shape, age, etc.) of breast to be simulated. The mother mold 332 includes a rim 346 that substantially surrounds the depression 344. In some instances, the rim 346 is sized and shaped to interface with a portion of the glove mold 334, as discussed below. Further, in some embodiments the mother mold 332 includes a feature or structure to facilitate separation of the glove mold 334 from the mother mold 332. In the illustrated embodiment, the mother mold 332 includes cutout 348 that allows access to the glove mold 334 when the glove mold and the mother mold are assembled together. In some embodiments, the mother mold 332 is formed of machined aluminum 6061 based on a model created using a 3D CAD system.

Referring more specifically to FIGS. 9-12, aspects of the glove mold 334 will be described. As shown, the glove mold 334 includes a rim 350 that defines an outer boundary of the glove mold. In some instances, the rim 350 is configured to interface with the rim 346 of the mother mold 332. The glove mold 334 also includes an inner surface 352 and an opposing outer surface 354. In some embodiments, the glove mold 334 is designed to follow simplified contours of a sculpted breast model. In that regard, detailing may be simplified in the areola/nipple complex so that the outside surface 354 of the glove mold 334 includes smooth contours and no undercuts. The internal geometry of the glove mold 334 as defined by the inner surface 352 replicates that of the sculpted breast model. Accordingly, products manufactured in the glove mold will be a replica of that model. The depression 344 of the mother mold 332 is the negative of the outer surface 354 of the glove mold 334 so that the glove mold 334 and the mother mold will mate together. For example, as shown in FIGS. 13 and 14, when the glove mold 334 is mated with the mother mold 332, the outer surface 354 of the glove mold is a generally perfect fit relative to depression 344 of the mother mold. In that regard, in some instances the glove mold 334 is manufactured within the mother mold 332 such that the mother mold forms the outer surface 354 and a master mold forms the inner surface 352. The glove mold 334 is manufactured from a platinum-cured silicone thermoset with a shore hardness between about 10 A and about 30 A. In some instances, the material used for the glove mold is a silicone thermoset with a shore hardness of 10 A (e.g., Dragon Skin® 10 Medium, Smooth-On, Inc., Easton, Pa.). The viscosity of this material makes it a good choice for a glove mold as it allows easy pouring and de-gassing of the material, with a cured flexibility that can be easily inverted to aid in product de-molding. Further, in the event that the glove mold 334 is damaged, the design of the molding system 330 makes it easy to replace the glove mold without having to replace the mother mold 332 and/or other components of the system. Additional details of using the molding system 330 are discussed below in the context of Example 3.

Numerous ultrasound renderings of ultrasound phantoms of the present disclosure will now be described. In that regard, the ultrasound renderings are based on ultrasound images obtained using a GE LOGIQ Book with a Linear Probe (Frequency of 8.0 MHz). However, it is understood that the ultrasound phantoms of the present disclosure may be utilized with virtually any type of ultrasound imaging devices. In that regard, in some embodiments the ultrasound phantoms of the present disclosure are particularly suited for calibrating ultrasound imaging devices. In that regard, because the ultrasound phantoms of the present disclosure have known and substantially fixed material properties, the ultrasound properties of the phantoms are consistent. Accordingly, ultrasound phantoms provide a consistent and repeatable ultrasound profile that may be utilized for calibrating ultrasound imaging devices.

Figures 15, 16:
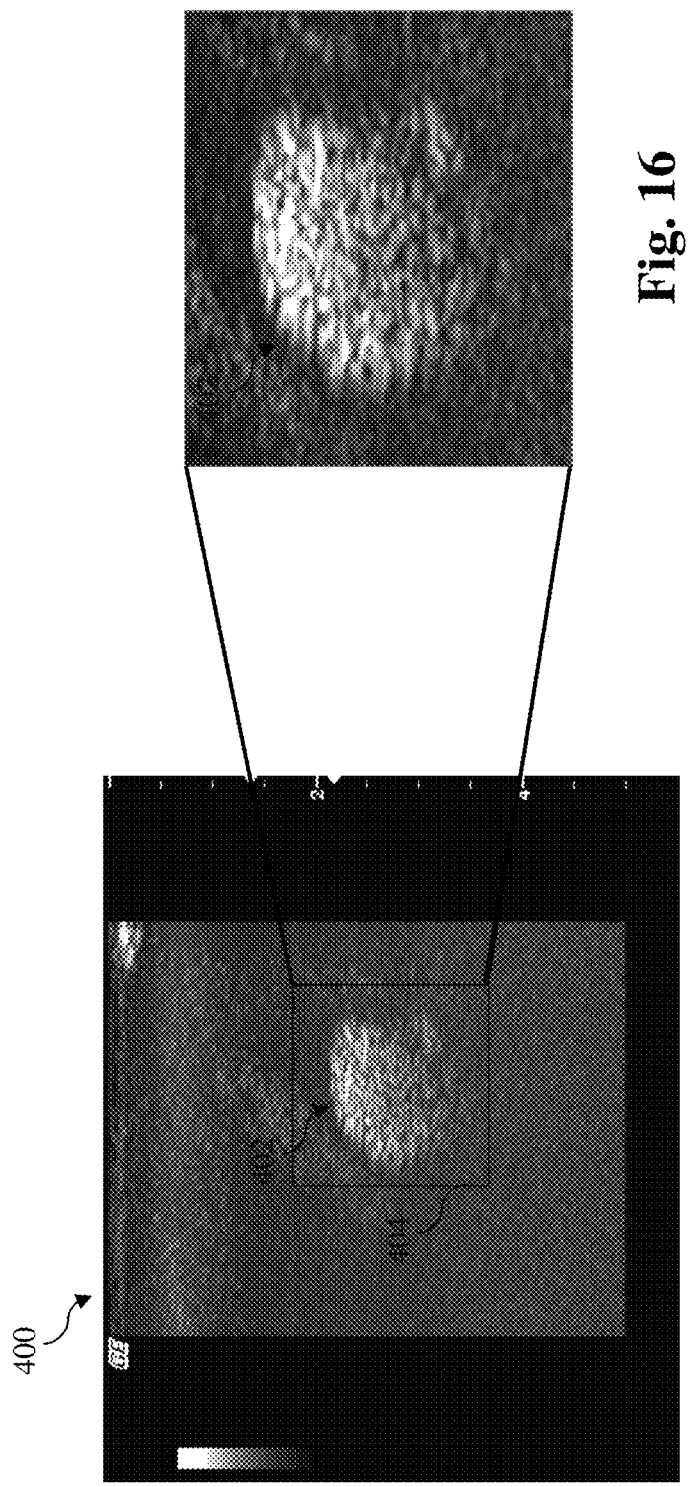
FIG. 15 is an ultrasound rendering of an ultrasound phantom of the present disclosure showing the presence of a simulated solid mass.
FIG. 16 is a close-up view of the solid mass of the ultrasound rendering of FIG. 15.

Referring now to FIGS. 15 and 16, shown therein are ultrasound renderings of an ultrasound phantom configured to simulate a solid mass according to an embodiment of the present disclosure. In that regard, FIG. 15 is an ultrasound rendering of the ultrasound phantom, while FIG. 16 is a close-up view of the solid mass of the ultrasound rendering of FIG. 15. As shown in FIG. 15, a color change in the ultrasound rendering 400 is indicative of a boundary or material change in the tissue. As shown, the solid mass 402 has a lighter color compared to the surrounding tissue. FIG. 16 is a close-up view of the solid mass 402 taken from within box 404 of FIG. 15.

Figures 17, 18:
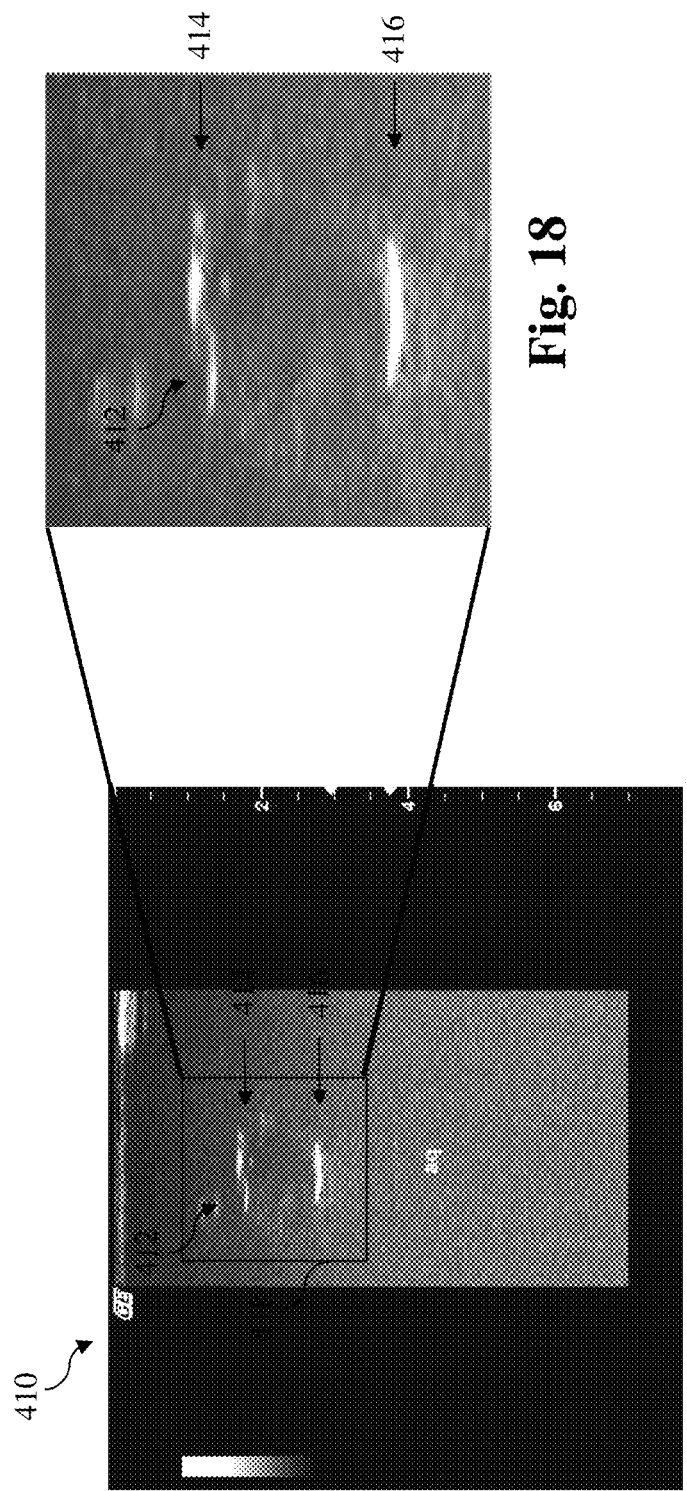
FIG. 17 is an ultrasound rendering of an ultrasound phantom of the present disclosure showing the presence of a simulated translucent mass.
FIG. 18 is a close-up view of the translucent mass of the ultrasound rendering of FIG. 17.

Referring now to FIGS. 17 and 18, shown therein are ultrasound renderings of an ultrasound phantom configured to simulate a translucent mass according to an embodiment of the present disclosure. In that regard, FIG. 17 is an ultrasound rendering of the ultrasound phantom, while FIG. 18 is a close-up view of the translucent mass of the ultrasound rendering of FIG. 17. In the ultrasound rendering 410 of FIG. 17, a translucent mass is shown having an upper boundary 414 and a lower boundary 416 as indicated by the change in color on the ultrasound image. FIG. 18 is a close-up view of the translucent mass 402 taken from within box 418 of FIG. 17.

Figure 19:
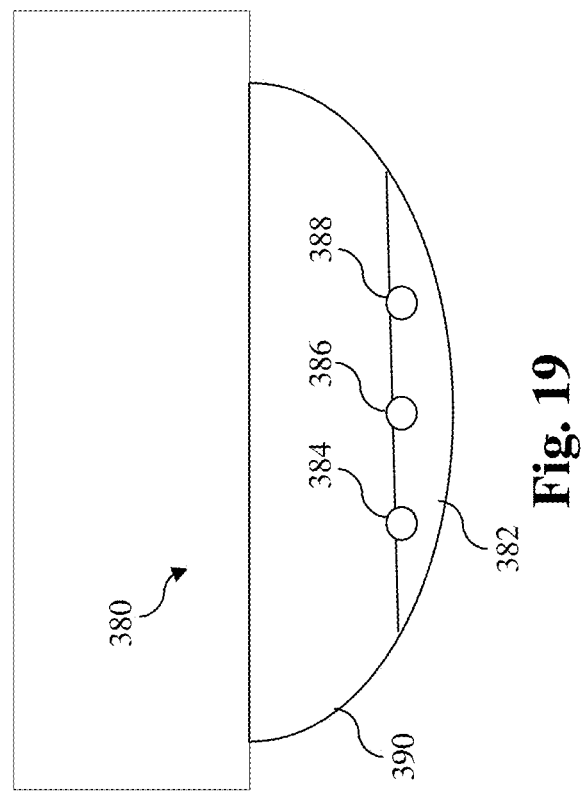
FIG. 19 is schematic diagram of an ultrasound phantom according to another embodiment of the present disclosure.

FIG. 19 is schematic diagram of an ultrasound phantom 380 according to another embodiment of the present disclosure. Specifically, the ultrasound phantom illustrates aspects of forming cysts in accordance with aspects of the present disclosure. In that regard, the ultrasound phantom 380 includes a first layer 382, a plurality of simulated cysts 384, 386, and 388, and a second layer 390. Typically, the first and second layers 382, 390 will be formed of the same material, while each of the cysts 384, 386, and 388 will be formed from a different material. In some particular instances, the first and second layers 382, 390 are formed of silicone and the cysts are a liquid (such as water). Accordingly, the formation of the silicone layers around the liquid creates liquid filled pockets that simulate cysts. These cysts can be used within a patient simulator to allow training in the detection, biopsy, and/or aspiration of cysts. Typically, suspending liquids with the desired properties to simulate abnormal tissue targets (such as cysts) within a silicone matrix has been problematic because the density of the liquid is less than the density of the silicone matrix. The present inventors have overcome this problem by utilizing the surface tension properties of the liquid to hold the liquid in place during subsequent silicone pours.

In that regard, in some instances the following technique is utilized to form the simulated cysts. A mold is provided to shape the general anatomical structure into which the cysts will be positioned. Accordingly, in some instances the mold is a breast mold. A layer of silicone (e.g., Smoothon Ecoflex 0010) is poured into the mold to form a layer of desired depth. Water from an eye dropper or syringe is positioned on the surface of the silicone to form a simulated cyst of the desired volume in the desired location. The water displaces the silicone and forms a well on the surface. After the silicone partially cures or gels a second layer of silicone is slowly poured over the existing surface to embed the water within the two silicone layers. It is understood that other silicones and liquids with the appropriate physical characteristic can be used. Also, it is understood that the liquid may be positioned within a well or depression in the first layer of material. Such a well or depression is formed using an insert mold in some instances. In that regard, the well or depression define at least a portion of the profile of the cyst in some instances.

Referring now to FIGS. 20 and 21, shown therein are ultrasound renderings of an ultrasound phantom configured to simulate a cyst according to an embodiment of the present disclosure. In that regard, FIG. 20 is an ultrasound rendering of the ultrasound phantom, while FIG. 21 is a close-up view of the cyst of the ultrasound rendering of FIG. 20. In the ultrasound rendering 420 of FIG. 20, a cyst 422 is shown having an upper boundary 424 and a lower boundary 426 as indicated by the change in color on the ultrasound image. FIG. 21 is a close-up view of the cyst 422 taken from within box 428 of FIG. 20.

Because cysts of the present disclosure are formed, in some instances, by suspending a liquid within silicon, the cysts may be utilized to train users on how to properly aspirate a cyst. Referring to FIGS. 22-25, aspiration of the cyst 422 of FIGS. 20 and 21 will be discussed. In that regard, FIG. 22 is an ultrasound rendering showing the introduction of a needle for aspirating the cyst; FIG. 23 is a close-up view of the cyst and needle of the ultrasound rendering of FIG. 22; FIG. 24 is an ultrasound rendering of the ultrasound phantom showing the fully aspirated cyst; and FIG. 25 is a close-up view of the fully aspirated cyst. As shown in the ultrasound rendering 430 of FIG. 22, a needle tip 432 is introduced into the cyst 422 between the upper and lower boundaries 424, 426. In that regard, a user may rely on the ultrasound visualization to ensure that the needle tip 432 has penetrated the cyst 422. In this manner, the ultrasound phantom with the cyst 422 can be utilized to train medical personnel on the proper techniques for identifying the cyst and advancing a needle to the cyst with the aid of ultrasound. FIG. 23 is a close-up view of the needle tip 432 positioned within the cyst 422 as shown within box 434 of FIG. 22. With the needle tip 432 positioned within the cyst 422, the fluid within the cyst can be extracted to aspirated. In some instances, a syringe is utilized to remove the fluid. In that regard, a user may translate a plunger of the syringe in order to aspirate the fluid from the cyst and into the syringe. Other aspiration devices may also be utilized to remove the fluid. As shown in the ultrasound rendering 440 of FIG. 24, with the removal of the fluid from within the cyst 422, the upper and lower boundaries of the cyst have collapsed. FIG. 25 is a close-up view of the collapsed cyst 422 as shown within box 442 of FIG. 24.

Figure 26:
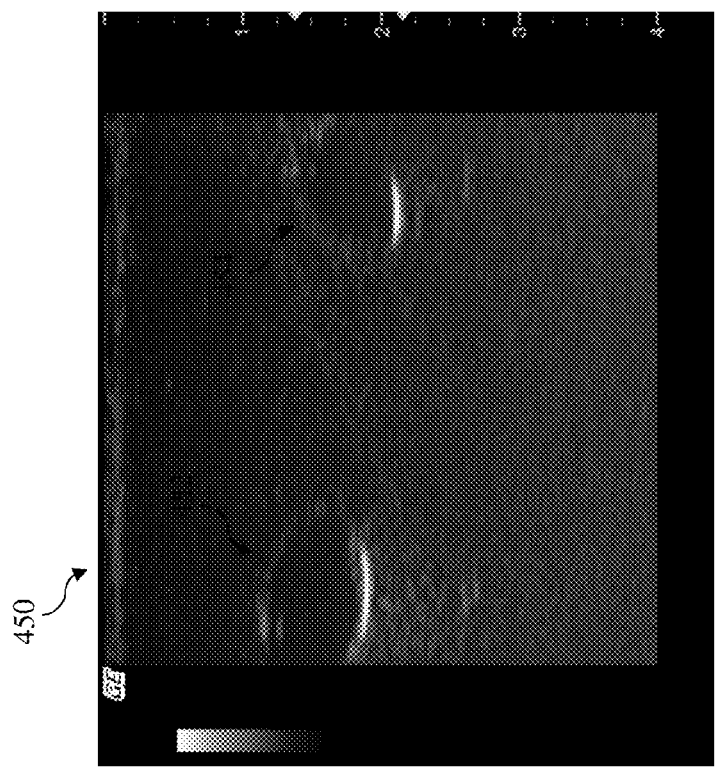
FIG. 26 is an ultrasound rendering of an ultrasound phantom of the present disclosure showing the presence of a plurality of cysts.

Referring now to FIG. 26, shown therein is an ultrasound rendering 450 of an ultrasound phantom of the present disclosure showing the presence of a plurality of cysts. In particular, the ultrasound rendering 450 shows a cyst 452 towards the left side of the image and a cyst 454 towards the right side of the image. Accordingly, it is understood that when a ultrasound phantom containing numerous cysts is visualized using ultrasound, that the cysts may be simultaneously visible depending upon the orientation of the ultrasound transducer relative to the cysts.

The materials of the present disclosure can be further refined for use in a variety of different medical ultrasound simulation applications, including central lines, catheterization, pericardial synthesis, and fetal ultrasound. By applying similar techniques and materials, it is possible to represent a multitude of different tissue types. For instance, in the case of either central lines or catheterization, a fluid-filled vessel is encapsulated within a tissue matrix. It is possible to utilize the same matrix materials as utilized in the manufacturing techniques for the ultrasound breast models described below. In that regard, the vessel can be manufactured in at least two ways. First, a vessel cavity can be incorporated in the matrix during the manufacturing process through the use of a removable pin/shaft whose diameter equals the internal diameter of the vessel. Second, a separate vessel wall can be manufactured in an injection mold from a silicone thermoset with a shore hardness different from that of the matrix material. The vessel wall can then be embedded within the matrix to define the vessel. A benefit of this second approach is that vessels with varying elasticity and compressibility can be manufactured. For example, it allows representation of a vein versus an artery with the corresponding varied geometry and compressibility. Examples of such embodiments will now be described.

Figure 27:
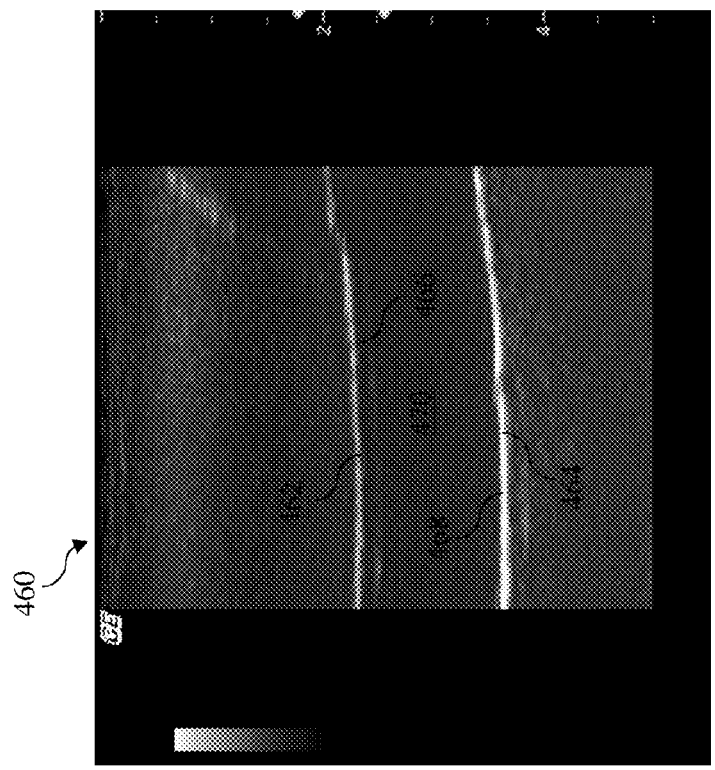
FIG. 27 is an ultrasound rendering of an ultrasound phantom for simulating a vessel according to another aspect of the present disclosure.

Referring to FIG. 27, shown therein is an ultrasound rendering 460 of an ultrasound phantom for simulating a vessel according to another aspect of the present disclosure. In that regard, the ultrasound phantom allows the visualization of the simulated vessel using standard ultrasound techniques. As shown, the ultrasound rendering 460 shows an upper vessel wall boundary 462 and an opposing lower vessel wall boundary 464. In that regard, inner surface 466 and 468 of the upper and lower vessel walls 462, 464, respectively, define the boundaries of lumen 470. Taken together, the vessel walls 462, 464 and lumen 470 create a simulated vessel.

Figure 30:
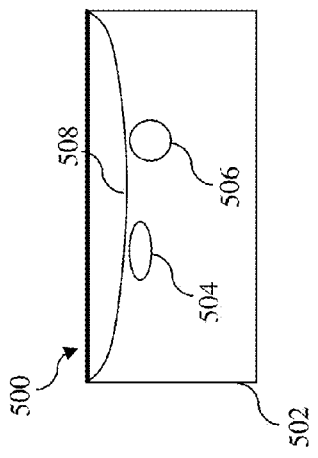
FIG. 30 is an end view of the vessel simulator of FIG. 28 similar to that of FIG. 29, but showing deformation of a surface of the vessel simulator.
Figure 28:
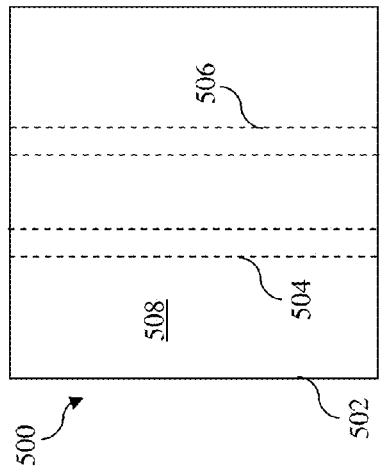
FIG. 28 is a schematic diagram of a vessel simulator according to an embodiment of the present disclosure.
Figure 29:
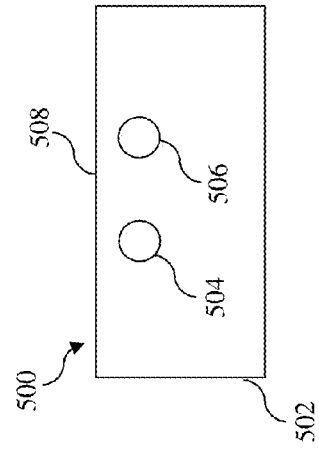
FIG. 29 is an end view of the vessel simulator of FIG. 28.

Referring now to FIGS. 28-30, shown therein is a vessel simulator 500 according to an embodiment of the present disclosure. Specifically, FIG. 28 is a top view of the vessel simulator 500, FIG. 29 is an end view of the vessel simulator; and FIG. 30 is an end view of the vessel simulator similar to that of FIG. 29, but showing deformation of a surface of the vessel simulator. As shown, the vessel simulator 500 includes a body portion 502 with two vessels 504 and 506 extending through the body portion. In the illustrated embodiment, the vessels extend entirely through the body portion and are substantially parallel to one another. In some instances, the vessels 504, 506 are configured to be coupled to a fluid supply system to that passes fluid, such as simulated blood, through the vessels. In such instances, the vessel simulator 500 can be used with Doppler ultrasound, where the flow of the fluid through the vessel is visualized on a screen (typically using color scales to represent the speed of the fluid). For example, in some instances, the vessel 504 is configured to simulate a vein, while the vessel 506 is configured to simulate an artery. In that regard, the vessels 504, 506 can be formed at varying depths relative to a surface 508 of the simulator. In some instances, the surface 508 represents a skin layer of the patient. Accordingly, the depths of the vessels can be selected based on the particular vessels that are being simulated. As shown in FIG. 30, when the surface 508 of the vessel simulator 500 is depressed (e.g., during user palpation), the vessel 504 is compressed, thereby simulating a vein, while the vessel 506 generally maintains its shape, thereby simulating an artery.

Figure 32:
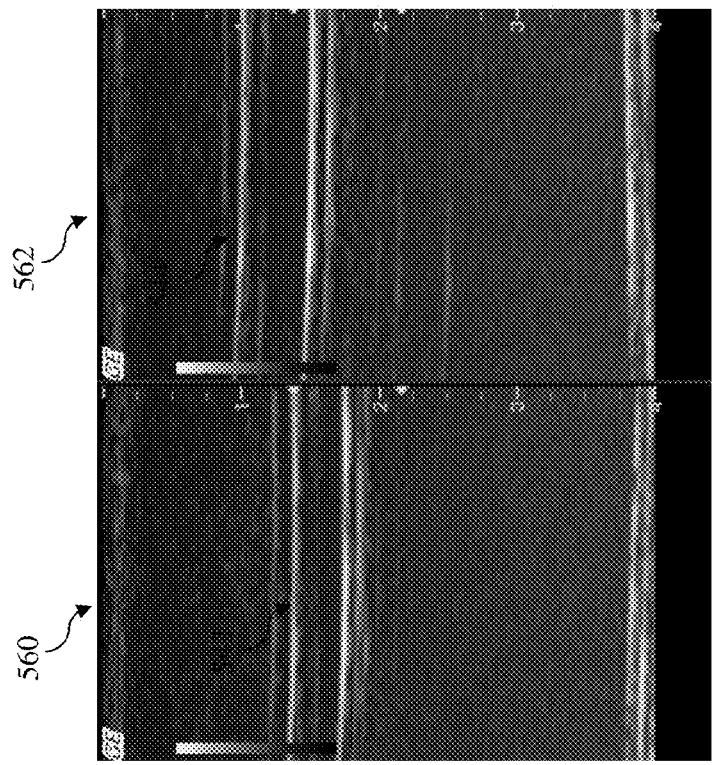
FIG. 32 illustrates ultrasound renderings of the vessel simulator of FIGS. 28-30 from two opposing side longitudinal views.
Figure 31:
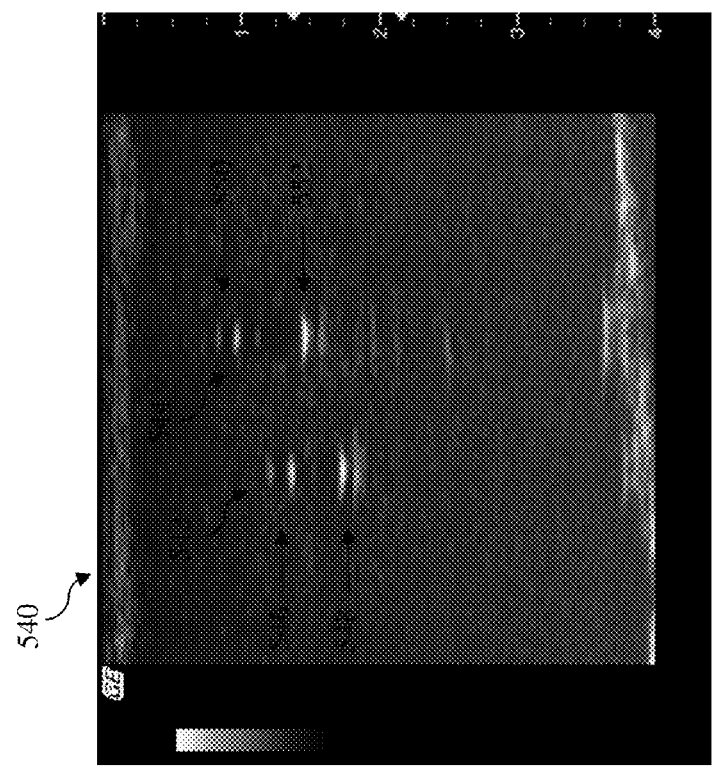
FIG. 31 is an ultrasound rendering of the vessel simulator of FIGS. 28-30 from a cross-sectional view.

Referring now to FIGS. 31 and 32, shown therein are ultrasound renderings of the vessel simulator similar to vessel simulator 500. Specifically, FIG. 31 is an ultrasound rendering of the vessel simulator from a cross-sectional view, while FIG. 32 illustrates two ultrasound renderings of the vessel simulator from opposing side longitudinal views. Referring more specifically to FIG. 31, the ultrasound rendering 540 shows vessels 542 and 544. In that regard, vessel 542 has an upper boundary 546 and a lower boundary 548, while vessel 544 has an upper boundary 550 and a lower boundary 552 that are visible on the ultrasound image. Referring to FIG. 32, ultrasound rendering 560 shows vessel 542 in the foreground, while ultrasound rendering 562 shows vessel 544 in the foreground.

Figure 33:
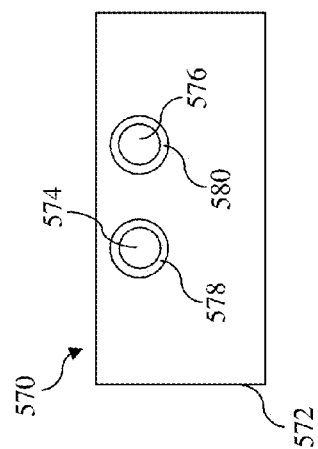
FIG. 33 is a schematic diagrammatic cross-sectional view of a vessel simulator according to another embodiment of the present disclosure.

Referring now to FIG. 33, shown therein is a vessel simulator 570 according to another embodiment of the present disclosure. In that regard, vessel simulator 570 illustrates an example of a vessel simulator where separate vessel walls have been utilized to define the vessels. In that regard, the vessel simulator 570 includes body portion 572 and a pair of vessels 574 and 576. The vessels 574, 576 are defined by vessel walls 578 and 580, respectively. As discussed above, in some instances the vessel walls 578, 580 are manufactured from a material with a shore hardness different from that of the body portion 572. In the illustrated embodiment, the vessel walls are embedded within the matrix material of the body portion 572 to define the vessels 574, 576.

Figure 34:
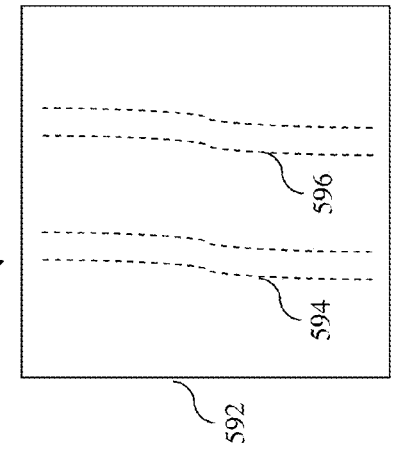
FIG. 34 is a schematic diagram top view of a vessel simulator according to another embodiment of the present disclosure.

Referring now to FIG. 34, shown therein is a vessel simulator 590 according to another embodiment of the present disclosure. In that regard, vessel simulator 590 illustrates an example of a vessel simulator where the vessels are non-linear and do not extend entirely through simulator. In particular, the vessel simulator 590 includes a body portion 592 and a pair of vessels 594, 596. As shown, the vessels 594, 596 have a non-linear profile and do not extend all of the way through the body portion. In that regard, while the vessels 594, 596 are shown as having the same profile, it is understood that each vessel may have a different linear and/or non-linear profile in other embodiments.

EXAMPLES

The invention is further defined by reference to the following examples, describing in detail the manufacture of the models of the present invention. These examples are for illustrative purposes only, and are not to be construed as limiting the appended claims.

Example 1

Ultrasound Image—Target with Encapsulated Air

Figure 35:
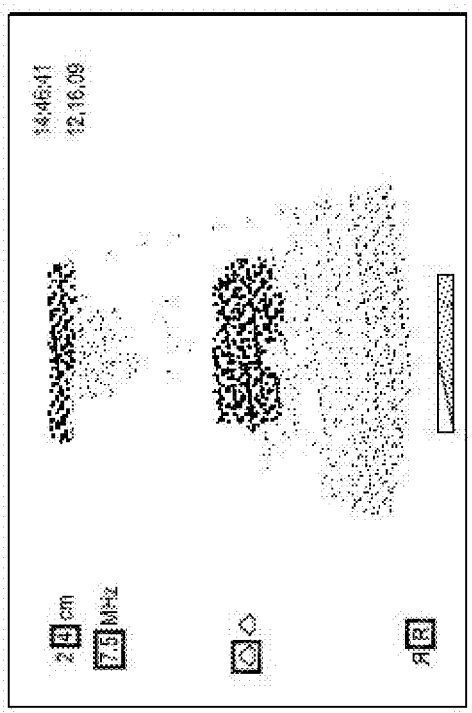
FIG. 35 is an ultrasound rendering of an ultrasound phantom according to one aspect of the present disclosure.

Referring to FIG. 35, shown therein is an ultrasound image of an ultrasound phantom according to one aspect of the present disclosure. In particular, FIG. 35 illustrates an ultrasound rendering of an ultrasound phantom comprised of 75% Factor II A341 and 25% LSR-05 and a SMOOTHON Dragon Skin target with encapsulated air. The target is approximately 5 mm×5 mm×10 mm in dimension. In that regard, each major marker on the image scale is 1 cm. The resulting ultrasound image is consistent with an ultrasound image of bone. The ultrasound rendering of FIG. 35 is a gray-scale representation of an actual ultrasound image obtained using a Bard Site-Rite 3 Surface Probe ultrasound machine.

Example 2

Ultrasound Image—Target without Encapsulated Air

Figure 36:
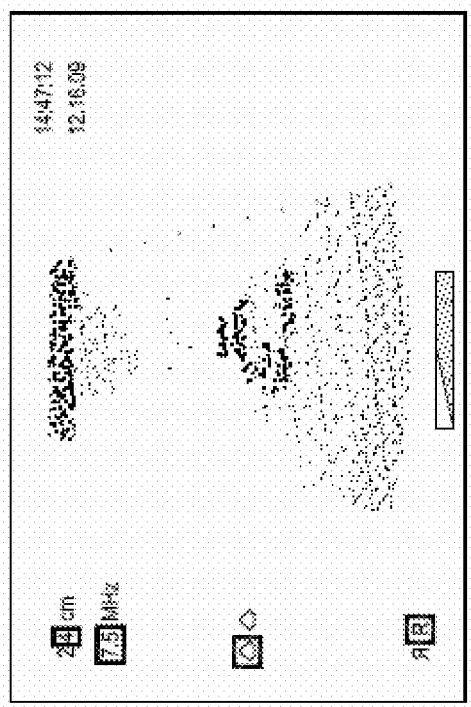
FIG. 36 is an ultrasound rendering of an ultrasound phantom according to another aspect of the present disclosure.

Referring to FIG. 36, shown therein is an ultrasound image of an ultrasound phantom similar to that of FIG. 35, but illustrating another aspect of the present disclosure. In particular, FIG. 6 illustrates an ultrasound image of an ultrasound phantom comprised of 75% Factor II A341 and 25% LSR-05 and a SMOOTHON Dragon Skin target without encapsulated air. The target is approximately 5 mm×5 mm×10 mm in dimension. Again, each major marker on the image scale is 1 cm and the resulting ultrasound image is consistent with an ultrasound image of bone. The ultrasound image of FIG. 36 is also a gray-scale representation of an actual ultrasound image obtained using a Bard Site-Rite 3 Surface Probe ultrasound machine.

Example 3

Manufacturing Ultrasound Breast Simulator, Such as Breast Model 200 Described Above, with Medium Skin Tone Manufacture of Dense masses (Material: Dragon Skin 10 Medium):
 a. Measure 15 g of Part B, add 15 g Part A, 2 g URE-FIL 9
 b. Mix and pour into silicone lump molds
 c. Cure in a 100° C. Oven for 30 minutes
Breast Manufacture Pour 1 (Material: Silicone 99-255):
 a. Clean the glove molds and liberally apply mold release
 b. Measure 150 g Part B, add 8 drops (approximately 0.4 mL) FuseFX Light Skin, 8 drops (approximately 0.4 mL) FuseFX Tan Skin, 6 drops (approximately 0.3 mL) FuseFX Warm Rosy Skin, 150 g Part A
 c. Mix and Vacuum until all bubbles are removed
 d. Divide into equal volumes and pour into the left and right glove molds
 e. Immediately after pouring the silicone, fill an eye-dropper with water, and dispense three cysts in the right breast and one in the left. The cysts in the right breast are located in the lower, outer quadrant, and their volume is approximately 1 mL. The cyst in the left breast is located in the lower, outer quadrant, and its volume is approximately 0.5 mL. The water displaces the silicone and becomes encapsulated in the silicone.
 f. After 45 minutes at room temperature, place two Dense Masses in the left breast, 1 under the areola and a second directly below that.
 g. Let the breast stand for an additional 30 minutes at room temperature before proceeding to Pour 2.
Breast Manufacture Pour 2 (Material: Silicone 99-255):
Note: Do not allow complete cure of the silicone between layers as this will prevent a uniform breast and may result in layering that is visible under ultrasound.
 a. Measure 220 g Part B, add 11 drops (approximately 0.55 mL) FuseFX Light Skin, 11 drops (approximately 0.55 mL) FuseFX Tan Skin, 9 drops (approximately 0.45 mL) FuseFX Warm Rosy Skin, 220 g Part A
 b. Mix and Vacuum until all bubbles are removed
 c. Divide into equal volumes and pour into the left and right glove molds
 d. Immediately after pouring the silicone, fill an eye-dropper with water, and dispense three cysts in the right breast and two in the left. One cyst in the right breast is located in the lower, outer quadrant (approximately 2 mL volume), the second in the lower, inner quadrant (approximately 0.5 mL volume), and the third directly south of the areola (approximately 0.5 mL volume). One cyst in the left breast is located in the lower, inner quadrant (approximately 1.5 mL volume), and the second cyst is directly below the areola (approximately 0.5 mL volume)
 e. After 45 minutes at room temperature, place two dense masses in the left breast, both in the lower, outer quadrant.
 f. Let the breast stand for an additional 30 minutes at room temperature before proceeding to Pour 3.
Breast Manufacture Pour 3 (Material: Silicone 99-255):
 a. Measure 300 g Part B, add 15 drops (approximately 0.75 mL) FuseFX Light Skin, 15 drops (approximately 0.75 mL) FuseFX Tan Skin, 12 drops (approximately 0.6 mL) FuseFX Warm Rosy Skin, 300 g Part A
 b. Mix and Vacuum until all bubbles are removed
 c. Divide into equal volumes and pour into the left and right glove molds
 d. Immediately after pouring the silicone, fill an eye-dropper with water, and dispense three cysts in the right breast. Two cysts are located in the lower, outer quadrant (approximately 1 mL volume each), and the third in the upper, outer quadrant (approximately 1.25 mL volume).
 e. Let the breast stand for an additional 1 hr 15 minutes at room temperature before proceeding to Pour 4.
Breast Manufacture Pour 4 (Material: Silicone 99-255):
 a. Measure 300 g Part B, add 15 drops (approximately 0.75 mL) FuseFX Light Skin, 15 drops (approximately 0.75 mL) FuseFX Tan Skin, 12 drops (approximately 0.6 mL) FuseFX Warm Rosy Skin, 300 g Part A
 b. Mix and Vacuum until all bubbles are removed
 c. Divide into equal volumes and pour into the left and right glove molds
 d. Immediately after pouring the silicone, fill an eye-dropper with water, and dispense one cyst in the right breast in the upper-outer quadrant (approximately 1.5 mL volume).
 e. After 45 minutes at room temperature, place two dense masses in the left breast, both in the axilla region.
 f. Let the breast stand for an additional 30 minutes at room temperature before proceeding to Pour 5.
Breast Manufacture Pour 5 (Material: Silicone 99-255):
 a. Measure 300 g Part B, add 15 drops (approximately 0.75 mL) FuseFX Light Skin, 15 drops (approximately 0.75 mL) FuseFX Tan Skin, 12 drops (approximately 0.6 mL) FuseFX Warm Rosy Skin, 300 g Part A
 b. Mix and Vacuum until all bubbles are removed
 c. Divide into equal volumes and pour into the left and right glove molds. Pour until the level reaches just below the height of the Glove Mold
 d. Allow it to cure for at least 4 hours, 8-12 hours if possible, at room temperature.
Attach a strip of Loop Velcro, 8 inches in length:
 a. Place a thin Layer of Sil-poxy on the back of Velcro, and center the Velcro on the Back Skin of the Breast.
 b. If necessary, place a flat board with weight to flatten the Velcro.
 c. Allow to cure for 30 minutes.
Gently remove the breast from the mold, and liberally clean any mold release from the surface.

Paint the coloring detail on the areola using blush-colored silicone paint (FuseFX M-105 Blush). Cure in a 100° C. Oven for 30 minutes Apply talc to the surface of the breast.

Cut an 8 inch length of Hook Velcro, and secure it on the Loop Velcro

The foregoing outlines features of several embodiments so that those skilled in the art may better understand the aspects of the present disclosure. Those skilled in the art should appreciate that they may readily use the present disclosure as a basis for other devices that simulate natural biological tissue, including human tissue. In particular, the materials and methods of the present disclosure may be readily used in any application where the simulation of human skin, with or without underlying tissue structures, is desired. Such applications include, but are not limited to, manikins, sex toys, puppets, costumes, medical training devices, and/or other devices. In that regard, the methods described above for manufacturing the breast tissue models of the present disclosure may similarly be used with molds configured to make other simulated human body portions, including any part or portion of the body having skin (e.g., arms, legs, hands, feet, torso, head, male genitalia, and portions thereof) as well as internal structures (e.g., heart, liver, kidneys, pancreas, stomach, colon, bladder, female genitalia, other internal organs, and portions thereof). Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed is:

1. A method of medical training, comprising:
    providing a human breast tissue model comprising:
        a body portion sized and shaped to simulate a human breast, the body portion including:
            a first silicone layer;
            a second silicone layer; and
            a liquid suspended directly between the first and second silicone layers to simulate a first pathology;
    performing a breast examination on the provided human breast tissue model; and
    removing a portion of the first pathology from the provided breast tissue model.

2. The method of claim 1, wherein the first pathology is a cyst.

3. The method of claim 1, wherein performing the breast examination includes identifying a location the cyst.

4. The method of claim 3, wherein removing the portion of the first pathology includes aspirating the cyst.

5. The method of claim 4, wherein aspirating the cyst includes introducing a needle tip into the cyst.

6. The method of claim 5, further comprising monitoring a position of the needle tip relative to the cyst utilizing ultrasound visualization.

7. The method of claim 1, wherein the body portion further includes a third silicone layer and a silicone material having an increased hardness relative to the second and third silicone layers positioned between the second and third silicone layers to simulate a second pathology.

8. The method of claim 7, wherein the second pathology is a dense mass.

9. The method of claim 8, further comprising biopsying at least a portion of the dense mass.

10. The method of claim 1, wherein the performing the breast examination includes ultrasound imaging of the provided human breast tissue model.

11. The method of claim 10, further comprising identifying a location of the first pathology based on boundaries in an ultrasound image.

12. The method of claim 1, wherein the performing the breast examination includes palpation of the provided human breast tissue model.

13. The method of claim 12, wherein the palpation is a spiral pattern.

14. The method of claim 12, wherein the palpation is a grid pattern.

15. The method of claim 1, further comprising attaching the provided human breast tissue model to a manikin torso.

16. The method of claim 15, wherein the manikin torso is part of a full size manikin.

17. The method of claim 15, further comprising detaching the provided human breast tissue model from the manikin torso.

18. The method of claim 15, further comprising attaching a second human breast tissue model to the manikin torso.

19. A system for medical training, the system comprising:
    a plurality of human breast tissue models having different pathology characteristics, each of the human breast tissue models comprising:
        a body portion sized and shaped to simulate a human breast, the body portion including:
            a first silicone layer;
            a second silicone layer; and
            a liquid suspended directly between the first and second silicone layers to simulate a first pathology; and
    a torso for mounting one or more of the plurality of human breast tissue models.

20. The system of claim 19, wherein the torso is part of a full size manikin.

* * * * *